(12) United States Patent
Hatakeyama et al.

(10) Patent No.: US 9,772,131 B2
(45) Date of Patent: Sep. 26, 2017

(54) HEAT PUMP DEVICE, AND AIR CONDITIONER, HEAT PUMP WATER HEATER, REFRIGERATOR, AND FREEZING MACHINE INCLUDING HEAT PUMP DEVICE

(71) Applicant: Mitsubishi Electric Corporation, Tokyo (JP)

(72) Inventors: Kazunori Hatakeyama, Tokyo (JP); Shota Kamiya, Tokyo (JP); Kenta Yuasa, Tokyo (JP); Shinya Matsushita, Tokyo (JP); Shinsaku Kusube, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 151 days.

(21) Appl. No.: 14/787,288

(22) PCT Filed: May 23, 2013

(86) PCT No.: PCT/JP2013/064399
§ 371 (c)(1),
(2) Date: Oct. 27, 2015

(87) PCT Pub. No.: WO2014/188566
PCT Pub. Date: Nov. 27, 2014

(65) Prior Publication Data
US 2016/0146523 A1 May 26, 2016

(51) Int. Cl.
*F25B 49/02* (2006.01)
*H02M 7/5395* (2006.01)
(Continued)

(52) U.S. Cl.
CPC .............. *F25B 49/025* (2013.01); *F25B 1/10* (2013.01); *F25B 13/00* (2013.01); *F25B 40/00* (2013.01);
(Continued)

(58) Field of Classification Search
CPC ...................................................... F25B 49/025
(Continued)

(56) References Cited

U.S. PATENT DOCUMENTS 6,014,004 A * 1/2000 Hamaoka .............. F25B 49/025
318/254.2
8,498,136 B2 7/2013 Shinomoto et al.
(Continued)

FOREIGN PATENT DOCUMENTS

JP 2004-271167 A 9/2004
JP 2011-15452 A 1/2011
(Continued)

OTHER PUBLICATIONS

Extended European Search Report dated Dec. 5, 2016 issued in corresponding EP patent application No. 13885425.2.
International Search Report of the International Searching Authority mailed Aug. 20, 2013 for the corresponding international application No. PCT/JP2013/064399 (and English translation).

*Primary Examiner* — David S Luo
(74) *Attorney, Agent, or Firm* — Posz Law Group, PLC

(57) ABSTRACT

A heat pump device capable of efficiently and reliably preventing a liquid refrigerant from stagnating in a compressor an air conditioner, a heat pump water heater, a refrigerator, and a freezing machine including the heat pump device. The configuration is such that, when the compressor is under operation standby, a high-frequency voltage synchronizing with a carrier signal is supplied to the compressor motor to carry out the locked energization of the compressor motor. From respective inter-phase voltages, respective phase voltages, or respective phase currents of the compres-
(Continued)

sor motor for a plurality of high-frequency energization cycles, the detection values for one high-frequency energization cycle are restored. A power value calculated using the restored detection values for one high-frequency energization cycle is controlled to coincide with a heating power command necessary for discharging the liquid refrigerant stagnated in the compressor to the outside of the compressor.

18 Claims, 15 Drawing Sheets

(51) Int. Cl.
  *F25B 1/10* (2006.01)
  *F25B 13/00* (2006.01)
  *F25B 40/00* (2006.01)
(52) U.S. Cl.
  CPC ..... *H02M 7/5395* (2013.01); *F25B 2313/003* (2013.01); *F25B 2341/0662* (2013.01); *F25B 2400/13* (2013.01); *F25B 2600/021* (2013.01); *Y02B 30/741* (2013.01)
(58) Field of Classification Search
  USPC ....................................................... 318/3, 34
  See application file for complete search history.

(56) References Cited

U.S. PATENT DOCUMENTS

| | | |
|---|---|---|
| 2012/0111043 A1 | 5/2012 | Hatakeyama et al. |
| 2012/0234031 A1 | 9/2012 | Hatakeyama et al. |
| 2013/0152609 A1 | 6/2013 | Hatakeyama et al. |
| 2013/0180273 A1 | 7/2013 | Hatakeyama et al. |
| 2013/0269370 A1 | 10/2013 | Hatakeyama et al. |
| 2013/0291578 A1 | 11/2013 | Hatakeyama et al. |

FOREIGN PATENT DOCUMENTS

| | | |
|---|---|---|
| JP | 2011-38689 A | 2/2011 |
| JP | 2011-61887 A | 3/2011 |
| JP | 2012-082996 A | 4/2012 |
| JP | 2012-087656 A | 5/2012 |
| JP | 2012-225767 A | 11/2012 |
| JP | 2013-19595 A | 1/2013 |
| WO | 2009/028053 A1 | 3/2009 |
| WO | 2012/086010 A1 | 12/2010 |
| WO | 2011/018863 A1 | 2/2011 |
| WO | 2012/029099 A1 | 3/2012 |
| WO | 2012/049763 A1 | 4/2012 |
| WO | 2012/081078 A1 | 6/2012 |
| WO | 2012/147192 A1 | 11/2012 |
| WO | 2012/172684 A1 | 12/2012 |

\* cited by examiner

| VOLTAGE VECTOR | VOLTAGE DIRECTION | UP | VP | WP | UN | VN | WN |
|---|---|---|---|---|---|---|---|
| V0 | 0 | 0 | 0 | 0 | 1 | 1 | 1 |
| V1 | +W | 0 | 0 | 1 | 1 | 1 | 0 |
| V2 | +V | 0 | 1 | 0 | 1 | 0 | 1 |
| V3 | −U | 0 | 1 | 1 | 1 | 0 | 0 |
| V4 | +U | 1 | 0 | 0 | 0 | 1 | 1 |
| V5 | −V | 1 | 0 | 1 | 0 | 1 | 0 |
| V6 | −W | 1 | 1 | 0 | 0 | 0 | 1 |
| V7 | 0 | 1 | 1 | 1 | 0 | 0 | 0 |

HEAT PUMP DEVICE, AND AIR CONDITIONER, HEAT PUMP WATER HEATER, REFRIGERATOR, AND FREEZING MACHINE INCLUDING HEAT PUMP DEVICE

CROSS REFERENCE TO RELATED APPLICATION

This application is a U.S. national stage application of International Patent Application No. PCT/JP2013/064399 filed on May 23, 2013, the disclosure of which is incorporated herein by reference.

TECHNICAL FIELD

The present invention relates to a heat pump device, and an air conditioner, a heat pump water heater, a refrigerator, and a freezing machine including the heat pump device.

BACKGROUND

A technology is known for preventing a liquid refrigerant from stagnating in a compressor. With this technology, during a period of non-operation of a heat pump device used in an air conditioner or the like, the motor winding is energized without driving the compressor motor (hereinafter referred to as "locked energization") and the compressor is heated to thereby vaporize and discharge the liquid refrigerant. For example, there is a technology for, when a compressor is under operation standby, supplying an alternating-current voltage having a frequency of approximately 20 kilohertz, which is higher than a normal frequency during a normal operation, to a compressor motor to thereby prevent a refrigerant in the compressor from being liquefied by making use of heat generated due to the switching loss of the switching elements from which the inverter is configured and heat generated by the motor (for example, Patent Literature 1).

In the case of an IPM (Interior Permanent Magnet) motor, winding inductance of a rotor changes depending on the position of the rotor. For example, the following technology is disclosed for preventing a refrigerant from stagnating in a compressor. With this technology, for example, when a predetermined time elapses while the temperature of a refrigeration cycle is equal to or lower than a predetermined value, an alternating-current voltage having a frequency of 14 kilohertz or more, which is higher than a normal frequency during a normal operation, is supplied to the motor in the compressor while shifting the phase of the alternating-current voltage to thereby efficiently heat the liquid refrigerant (for example, Patent Literature 2).

Moreover, for example, a technology is disclosed for attempting to keep the amount of heat of the compressor constant irrespective of the effects due to manufacturing variations and environmental variations. With this technology, a section where an electric current flowing to the motor winding is relatively stable near a peak is set as a current detection section, and, on the basis of the peak current value detected at this timing, an optimum voltage command value for obtaining the power necessary for vaporizing and discharging a refrigerant stagnated in the compressor is calculated (for example, Patent Literature 3).

To keep the amount of heat of the compressor constant, i.e., to keep the amount of power supplied to the compressor motor constant and reliably prevent the refrigerant from stagnating in the compressor, it is necessary to more accurately detect the electric current flowing to the motor winding. However, when the frequency with which the locked energization of the compressor motor is performed increases, the section where the electric current flowing to the motor winding is relatively stable near the peak decreases and current detection accuracy deteriorates. Even when an analog current value detected at a sampling cycle undergoes AD-conversion in order to perform current detection, if the frequency with which the locked energization of the compressor motor is performed is high, the number of samples detectable during one cycle decreases. Therefore, to improve the detection accuracy, a microcomputer or the like capable of performing sampling at a high sampling rate is necessary. Therefore, for example, a technology is disclosed for equally dividing the sampling cycle when performing the AD conversion into a plurality of sampling cycles and performing current detection while shifting a plurality of sampling timings one by one to detect power with a high accuracy equivalent to the detection accuracy of sampling performed at a sampling frequency that is doubled or more (for example, Patent Literature 4).

PATENT LITERATURE

Patent Literature 1: Japanese Patent Application Laid-Open No. 2004-271167
Patent Literature 2: Japanese Patent Application Laid-Open No. 2012-82996
Patent Literature 3: WO 2009/028053
Patent Literature 4: Japanese Patent Application Laid-Open No. 2012-225767

However, in the technology described in Patent Literature 4, because the sampling cycle is equally divided into a plurality of sampling cycles, there is no relation between timing for performing current detection and a current cycle. Accordingly, when there is a shift of the detection timing with respect to the current cycle, the detection accuracy deteriorates. Therefore, there is a problem in that the amount of power supplied to the compressor motor cannot be kept constant.

SUMMARY

The present invention has been devised in view of the above and it is an object of the present invention to provide a heat pump device that can keep the amount of power supplied to the compressor motor constant and keep the amount of heat to the compressor constant when a high-frequency voltage having a frequency higher than the frequency during a normal operation is supplied to the compressor motor to perform locked energization and therefore can efficiently and reliably prevent a liquid refrigerant from stagnating in the compressor. Further, it is an object of the present invention to provide and an air conditioner, a heat pump water heater, a refrigerator, and a freezing machine including the heat pump device.

In order to solve the above problems and achieve the object, a heat pump device according to an aspect of the present invention is a heat pump device that includes a compressor including a compression mechanism that compresses a refrigerant and a compressor motor that drives the compression mechanism, a heat exchanger, an inverter that applies a desired voltage to the compressor motor, and an inverter control unit that generates a driving signal for driving the inverter, wherein the inverter control unit includes a locked-energization control unit that outputs a high-frequency-voltage phase command when a high-frequency voltage having a frequency higher than a frequency during a normal operation is supplied to the compressor motor to perform locked energization of the compressor motor while the compressor is under operation standby, that restores, on a basis of respective inter-phase voltages, respective phase voltages, or respective phase currents of the compressor motor for a plurality of high-frequency energization cycles when performing the locked energization, the respective inter-phase voltages, the respective phase voltages, or the respective phase currents for one high-frequency energization cycle, and that outputs a high-frequency voltage command on a basis of the restored respective detection values for one high-frequency energization cycle, and a driving-signal generating unit that generates the driving signal on a basis of the high-frequency-voltage phase command and the high-frequency voltage command.

According to the present invention, there is an effect in that, when a high-frequency voltage having a frequency higher than a frequency during a normal operation is supplied to the compressor motor to perform locked energization, it is possible to keep the amount of power supplied to the compressor motor constant and keep the amount of heat to the compressor constant, and therefore efficiently and reliably prevent the liquid refrigerant from stagnating in the compressor.

DESCRIPTION OF EMBODIMENTS

A heat pump device, and an air conditioner, a heat pump water heater, a refrigerator, and a freezing machine including the heat pump device according to embodiments of the present invention are explained below with reference to the accompanying drawings. Note that, the present invention is not limited by the embodiments explained below.

First Embodiment

Figure 1:
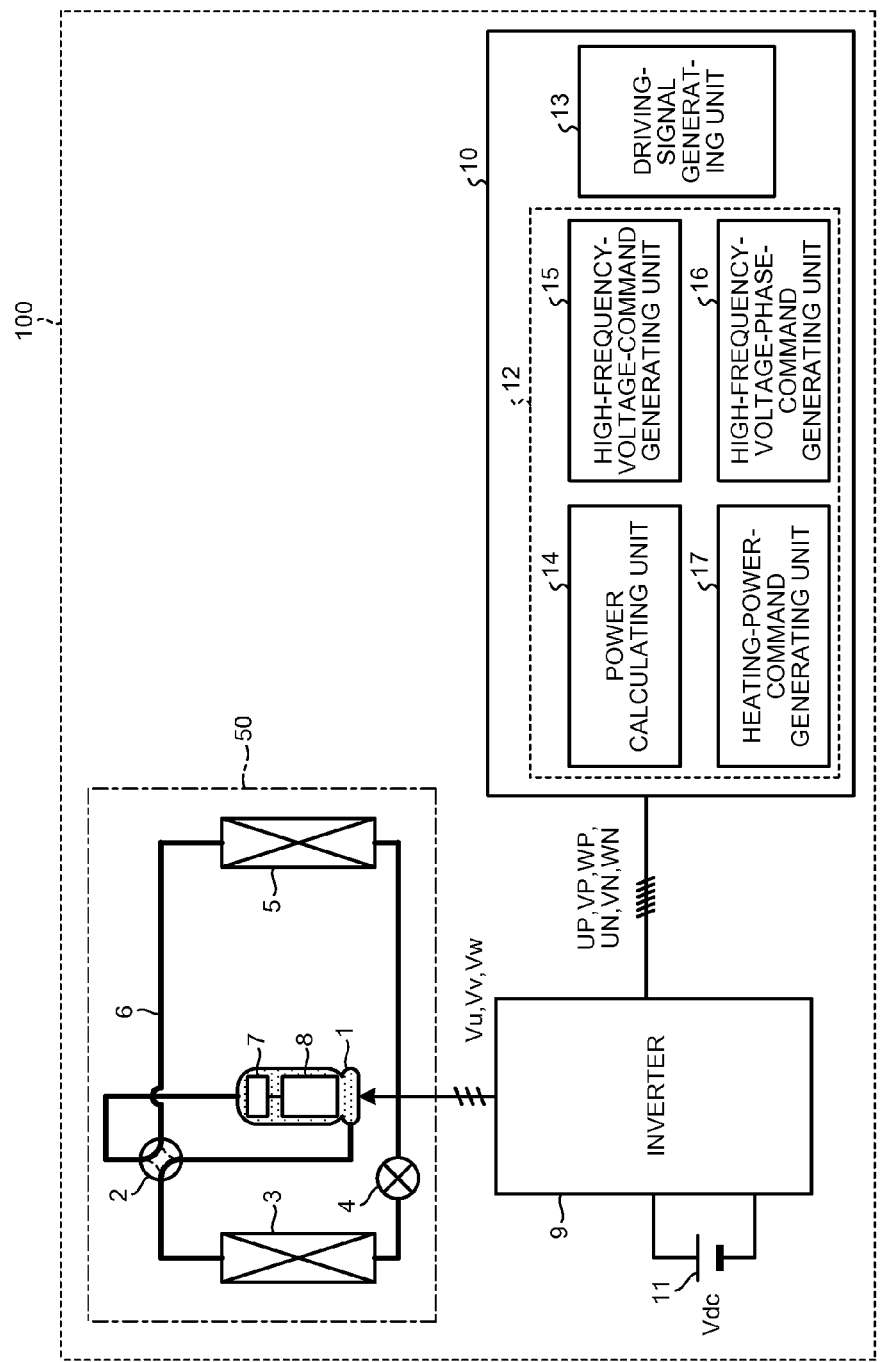
FIG. 1 is a diagram illustrating a configuration example of a heat pump device according to a first embodiment.

FIG. 1 is a diagram of a configuration example of a heat pump device according to a first embodiment. As illustrated in FIG. 1, in a heat pump device 100 according to the first embodiment, a compressor 1, a four-way valve 2, a heat exchanger 3, an expansion mechanism 4, and a heat exchanger 5 are sequentially connected via a refrigerant pipe 6 to form a refrigeration cycle 50. Note that, in the example illustrated in FIG. 1, the basic configuration forming the refrigeration cycle 50 is illustrated. Some components are omitted in FIG. 1.

A compression mechanism 7, which compresses a refrigerant, and a compressor motor 8, which actuates the compression mechanism 7, are provided in the compressor 1. The compressor motor 8 is a three-phase motor including motor windings for three phases, i.e., a U phase, a V phase, and a W phase.

An inverter 9 is electrically connected to the compressor motor 8. The inverter 9 is connected to a direct-current voltage source 11 and applies voltages Vu, Vv, and Vw respectively to the windings of the U phase, the V phase, and the W phase of the compressor motor 8 using, as a power supply, a direct-current voltage (a bus voltage) Vdc supplied from the direct-current voltage source 11.

An inverter control unit 10 is electrically connected to the inverter 9. The inverter control unit 10 outputs, to the inverter 9, driving signals for driving the inverter 9. The inverter control unit 10 has two operation modes, i.e., a normal operation mode and a heating operation mode.

In the normal operation mode, the inverter control unit 10 generates and outputs PWM (Pulse Width Modulation) signals (driving signals) for rotationally driving the compressor motor 8. In the heating operation mode, unlike the normal operation mode, the inverter control unit 10 energizes the compressor motor 8 such that the compressor motor 8 is not rotationally driven when the compressor 1 is under operation standby (hereinafter referred to as "locked energization") to heat the compressor motor 8, thereby warming and vaporizing the liquid refrigerant stagnated in the compressor 1 and discharging the refrigerant. In the present embodiment, in the heating operation mode, the inverter control unit 10 energizes the compressor motor 8 with a high-frequency current that the compressor motor 8 cannot follow (hereinafter referred to as "high-frequency energization") to thereby heat the liquid refrigerant stagnated in the compressor 1 by using the heat generated in the compressor motor 8.

When the high-frequency energization is carried out, if a high-frequency voltage having a frequency equal to or higher than the operating frequency during the compressing operation is applied to the compressor motor 8, the rotor in the compressor motor 8 cannot follow the high-frequency voltage; therefore, rotation and vibration do not occur. Therefore, it is desirable to set the frequency of the voltage output from the inverter 9 to be equal to or higher than the operating frequency during the compressing operation.

In general, the operating frequency during the compressing operation is approximately 1 kilohertz at most. Therefore, when the high-frequency energization is carried out while the compressor 1 is under operation standby, a high-frequency voltage equal to or higher than 1 kilohertz, which is the operating frequency during the compressing operation, only has to be applied to the compressor motor 8. For example, if a high-frequency voltage equal to or higher than 14 kilohertz is applied to the compressor motor 8, vibration sound of the iron core of the compressor motor 8 nearly approaches the upper limit of the audible frequency. Therefore, there is also an effect for a reduction in noise. For example, if the high-frequency voltage is set to approximately 20 kilohertz, which is outside the audible frequency, it is possible to further reduce noise. However, when the high-frequency energization is carried out, it is desirable, in order to ensure reliability, to apply a high-frequency voltage having a frequency equal to or lower than the maximum rated frequency of the switching elements in the inverter 9.

In the case where the compressor motor 8 is an embedded magnet-type motor having an IPM (Interior Permanent Magnet) structure, when the high-frequency energization is carried out, the rotor surface, which a high-frequency magnetic flux crosses, also becomes a heat generating portion. Therefore, it is possible to realize prompt heating of the compression mechanism through an increase in the refrigerant contact surface. Thus, the refrigerant can be heated more efficiently.

Components and operations for realizing the heating operation mode are explained below.

The inverter control unit 10 includes a locked-energization control unit 12 and a driving-signal generating unit 13, which are components for realizing the heating operation mode. The locked-energization control unit 12 includes a power calculating unit 14, a high-frequency-voltage-command generating unit 15, a high-frequency-voltage-phase-command generating unit 16, and a heating-power-command generating unit 17. Note that, in the figure, some of the components for realizing the normal operation mode are omitted.

Figure 2:
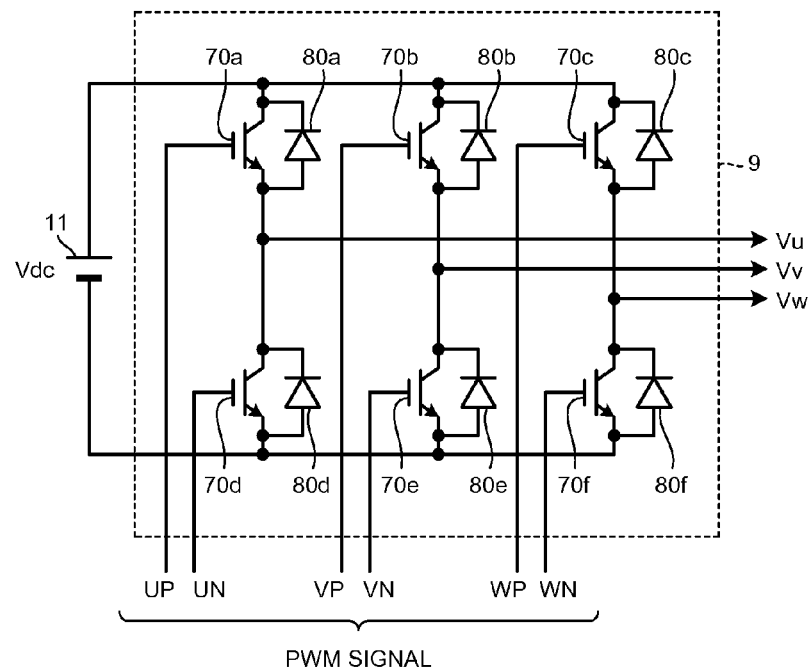
FIG. 2 is a diagram illustrating a configuration example of an inverter in the heat pump device according to the first embodiment.

FIG. 2 is a diagram of a configuration example of the inverter 9 in the heat pump device according to the first embodiment. As illustrated in FIG. 2, the inverter 9 includes bridge-connected switching elements 70a to 70f and reflux diodes 80a to 80f respectively connected to the switching elements 70a to 70f in parallel. The inverter 9 is connected to the direct-current voltage source 11. In accordance with PWM signals (UP, VP, WP, UN, VN, and WN) sent from the inverter control unit 10, the inverter 9 drives the switching elements respectively corresponding to the PWM signals (UP corresponds to the switching element 70a, VP corresponds to the switching element 70b, WP corresponds to the switching element 70c, UN corresponds to the switching element 70d, VN corresponds to the switching element 70e, and WN corresponds to the switching element 70f) using the bus voltage Vdc as a power supply to generate voltages Vu, Vv, and Vw for three phases respectively applied to the windings of the U phase, the V phase, and the W phase of the compressor motor 8.

Figure 3:
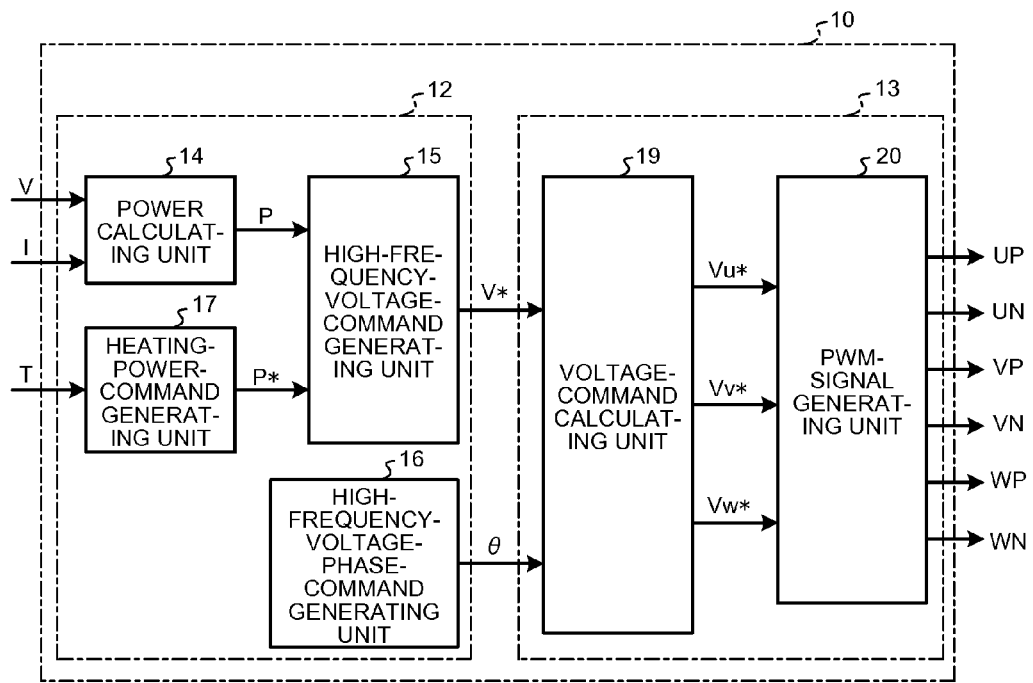
FIG. 3 is a diagram illustrating a configuration example of an inverter control unit in the heat pump device according to the first embodiment.

FIG. 3 is a diagram illustrating a configuration example of the inverter control unit according to the first embodiment. The inverter control unit 10 is configured to include, as explained above, the locked-energization control unit 12 including the power calculating unit 14, the high-frequency-voltage-command generating unit 15, the high-frequency-voltage-phase-command generating unit 16, and the heating-power-command generating unit 17 and the driving-signal generating unit 13 including a voltage-command calculating unit 19 and a PWM-signal generating unit 20.

The high-frequency-voltage-phase-command generating unit 16 generates and outputs a high-frequency-voltage phase command $\theta$ when the locked energization is performed.

The power calculating unit 14 restores, on the basis of the respective inter-phase voltages, respective phase voltages, or respective phase currents (in FIG. 3, described as "V" and "I") of the compressor motor 8 for a plurality of high-frequency energization cycles when the locked energization is performed, the respective inter-phase voltages, respective phase voltages, or respective phase currents for one high-frequency energization cycle and calculates a power value P supplied to the compressor motor 8 using the restored detection values for one high-frequency energization cycle. Note that, voltage detectors or current detectors that detect the respective inter-phase voltages, respective phase voltages, or respective phase currents of the compressor motor 8 are not illustrated in the figure. However, known detectors only have to be used as the detectors. The present invention is not limited by the configurations and the types of the detectors.

The heating-power-command generating unit 17 detects at least one of the temperature of any of the parts or components configuring the heat pump device 100 and the atmospheric temperature (in FIG. 3, described as "T"), estimates the amount of liquid refrigerant stagnated in the compressor 1, and generates a heating power command P* necessary for discharging the liquid refrigerant to the outside of the compressor 1.

The high-frequency-voltage-command generating unit 15 generates a high-frequency voltage command V* such that the power value P calculated by the power calculating unit 14 coincides with the heating power command P* generated by the heating-power-command generating unit 17.

The voltage-command calculating unit 19 generates three-phase (U phase, V phase, and W phase) voltage command values Vu*, Vv*, and Vw* on the basis of the high-frequency voltage command V* and the high-frequency-voltage phase command $\theta$.

The PWM-signal generating unit 20 generates, on the basis of the three-phase voltage command values Vu*, Vv*, and Vw* and the bus voltage Vdc, the PWM signals (UP, VP, WP, UN, VN, and WN) for driving the inverter 9.

Figure 4:
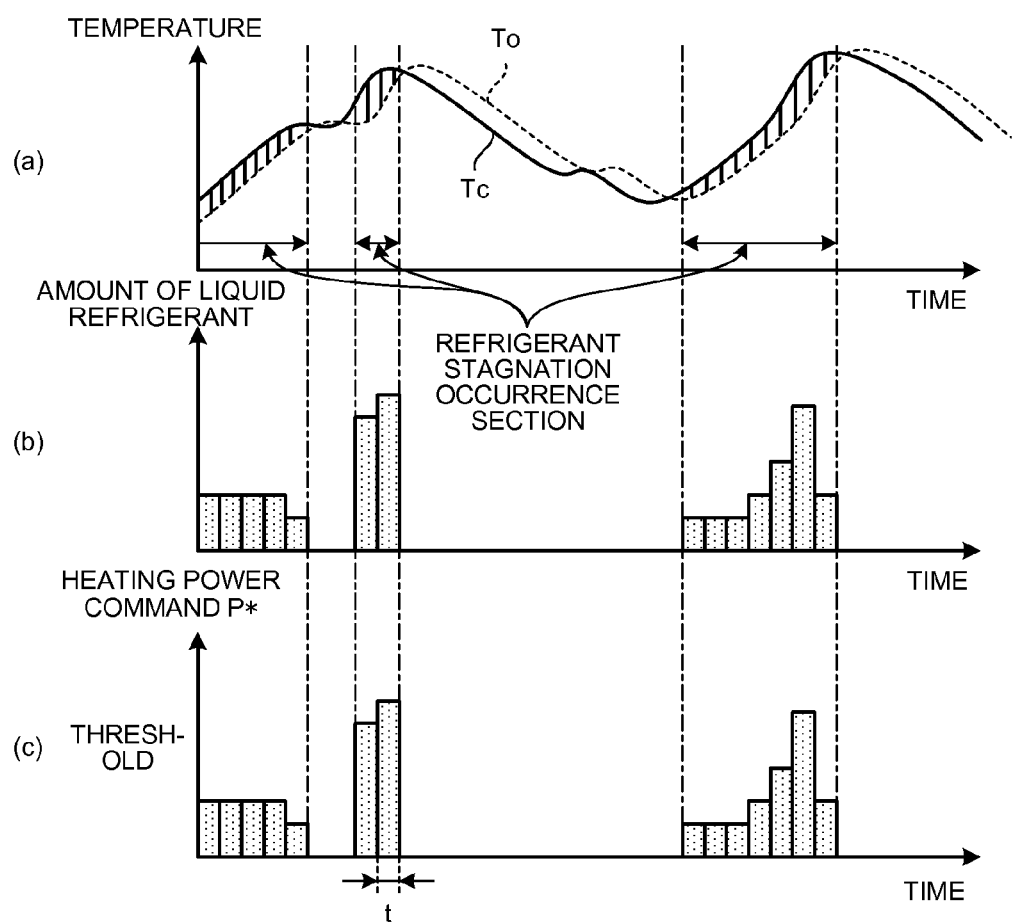
FIG. 4 is a diagram for explaining the operation of a heating-power-command generating unit in the heat pump device according to the first embodiment.

The operation of the heating-power-command generating unit 17 in the heat pump device 100 according to the first embodiment is explained with reference to FIG. 4. FIG. 4 is a diagram for explaining the operation of the heating-power-command generating unit in the heat pump device according to the first embodiment.

The heating-power-command generating unit 17 detects atmospheric temperature (e.g., outdoor air temperature) Tc around the compressor 1 and temperature (compressor temperature) To of the compressor 1 and estimates, on the basis of the atmospheric temperature Tc and the compressor temperature To, the amount of liquid refrigerant stagnated in the compressor 1. The refrigerant circulating in the refrigeration cycle 50 condenses and stagnates in a place where the temperature is the lowest among the components forming the refrigeration cycle 50. The compressor 1 has the largest heat capacity among the components forming the refrigeration cycle 50. Therefore, as illustrated in FIG. 4(a), the compressor temperature To rises later than the rise of the atmospheric temperature Tc. Thus, the compressor 1 has the lowest temperature. Therefore, the liquid refrigerant is stagnated in the compressor 1. In the present embodiment, the heating-power-command generating unit 17 estimates the amount of liquid refrigerant per unit time t as illustrated in FIG. 4(b) on the basis of, for example, a relation between the atmospheric temperature Tc and the compressor temperature To obtained by an experiment or the like in advance. Note that, when the heat capacity of the compressor 1 is known in advance, it is possible to estimate the amount of liquid refrigerant per unit time t by detecting only the atmospheric temperature Tc and estimating the degree of delay in the change in the compressor temperature To with respect to the change in the atmospheric temperature Tc. In this case, it is possible to reduce the number of sensors for detecting the compressor temperature To and thus reduce the cost. It goes without saying that it is also possible to estimate the amount of liquid refrigerant per unit time t by detecting, instead of the atmospheric temperature Tc, the temperature of the heat exchanger 3 or the like having a heat capacity smaller than the heat capacity of the compressor 1 among the components forming the refrigeration cycle 50.

The amount of liquid refrigerant in the compressor 1 can be detected more directly. For example, it is possible to realize the detection using, as a sensor for detecting the amount of liquid refrigerant in the compressor 1, for example, a capacitance sensor for measuring the amount of liquid or a sensor for measuring the distance between the upper part of the compressor 1 and the liquid surface of the refrigerant using a laser, sound, electromagnetic waves, or the like. Note that, as a method of estimating or detecting the amount of liquid refrigerant, any one of the methods explained above can be used.

The heating-power-command generating unit 17 calculates, according to the estimated or detected amount of liquid refrigerant, the heating power command P* necessary for discharging the liquid refrigerant stagnated in the compressor 1 and outputs the heating power command P* to the high-frequency-voltage-command generating unit 15. When the amount of liquid refrigerant stagnated in the compressor 1 is large, the heating power command P* is set to a large value. When the amount of liquid refrigerant is zero, the heating power command P* is set to zero or control is performed such that the heating is stopped. Consequently, it is possible to obtain the power necessary for the minimum amount of heating required. The heating power command P* changes depending on the type and the size of the compressor 1. When the compressor 1 is large, is made of a low-heat-conducting material, or has a low-heat-conducting shape, the heating power command P* only has to be increased. This can be realized by, for example, retaining a plurality of tables indicating a relation between the amount of liquid refrigerant and the heating power command P* and reading, from the table corresponding to the type or the size of the compressor 1, the heating power command P* corresponding to the amount of liquid refrigerant stagnated in the compressor 1.

A method of generating the voltage command values Vu*, Vv*, and Vw* by the voltage-command calculating unit 19 and a method of generating the PWM signals by the PWM-signal generating unit 20 are explained with reference to FIG. 5 and FIG. 6.

Figures 5, 6:
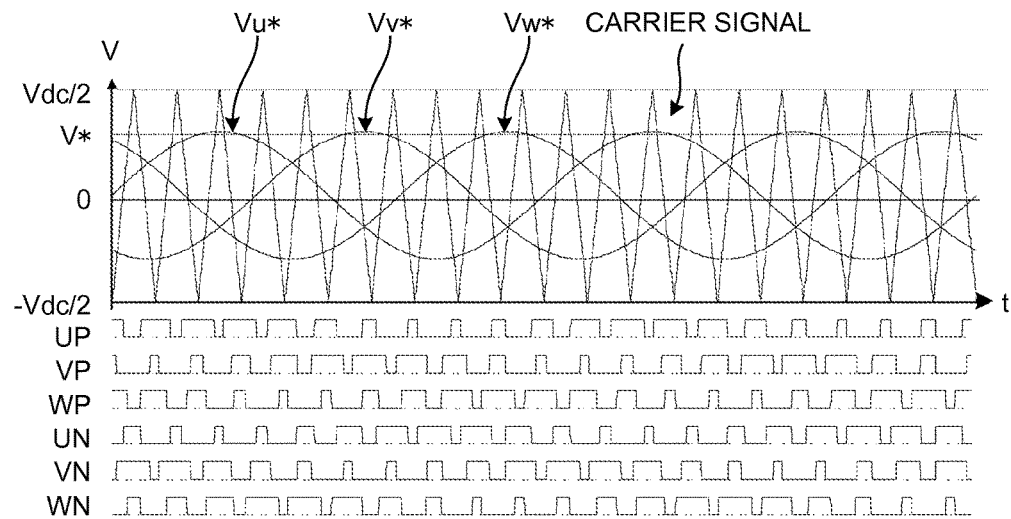
FIG. 5 is a diagram illustrating signal waveforms for explaining a method of generating voltage command values and PWM signals.
FIG. 6 is a diagram illustrating eight switching patterns in the heat pump device according to the first embodiment.

FIG. 5 is a diagram illustrating signal waveforms for explaining the method of generating voltage command values and PWM signals.

When the compressor motor 8 is a three-phase motor, in general, the U phase, the V phase, and the W phase are different from one another by 120° ($=2\pi/3$). Therefore, the voltage command values Vu*, Vv*, and Vw* are defined as cosine waves (sine waves) having phases different from one another by $2\pi/3$ as indicated by the following Equations (1) to (3):

$$Vu^* = V^* \times \cos\theta \qquad (1)$$

$$Vv^* = V^* \times \cos(\theta - (2/3)\pi) \qquad (2)$$

$$Vw^* = V^* \times \cos(\theta + (2/3)\pi) \qquad (3)$$

The voltage-command calculating unit 19 calculates, on the basis of the voltage command V* and the voltage phase command θ, the voltage command values Vu*, Vv*, and Vw* using Equations (1) to (3) and outputs the voltage command values Vu*, Vv*, and Vw* to the PWM-signal generating unit 20. The PWM-signal generating unit 20 compares the voltage command values Vu*, Vv*, and Vw* with a carrier signal (a reference signal) having an amplitude value of ±(Vdc/2) at a predetermined frequency and generates the PWM signals UP, VP, WP, UN, VN, and WN on the basis of the relation of their magnitudes to each other.

Note that, in Equations (1) to (3), the voltage commands Vu*, Vv*, and Vw* are calculated by a simple trigonometric function; however, besides the method explained above, the voltage command values Vu*, Vv*, and Vw* can be calculated using other methods such as two-phase modulation, third harmonic superposition modulation, and space vector modulation.

When the voltage command value Vu* is larger than the carrier signal, UP is set to a voltage for turning on the switching element 70a and UN is set to a voltage for turning off the switching element 70d. When the voltage command value Vu* is smaller than the carrier signal, conversely, UP is set to a voltage for turning off the switching element 70a and UN is set to a voltage for turning on the switching element 70d. The same applies to the other signals. Specifically, VP and VN are determined by comparing the voltage command value Vv* and the carrier signal and WP and WN are determined by comparing the voltage command value Vw* and the carrier signal.

In the case of general inverters, a complementary PWM system is adopted. Therefore, UP and UN, VP and VN, and WP and WN are in a relation of logical inversion from each other. Consequently, there are eight switching patterns in total.

FIG. 6 is a diagram illustrating the eight switching patterns in the heat pump device according to the first embodiment. Note that, in FIG. 6, signs V0 to V7 are attached to voltage vectors generated by the respective switching patterns. The directions of voltages of the respective voltage vectors are represented by ±U, ±V, and ±W (and 0 when a voltage is not generated). Here, +U indicates a voltage for generating an electric current in the U-phase direction flowing into the compressor motor 8 via the U phase and flowing out from the compressor motor 8 via the V phase and the W phase and −U indicates a voltage for generating an electric current in the −U-phase direction flowing into the compressor motor 8 via the V phase and the W phase and flowing out from the compressor motor 8 via the U phase. The same interpretation applies to ±V and ±W.

By combining the switching patterns illustrated in FIG. 6, it is possible to cause the inverter 9 to output desired voltages. For example, in the normal operation mode for performing a normal compression operation, it is a general practice to change the voltage phase command θ in the above Equations (1) to (3) to be within the range of several tens of hertz to several hundreds of hertz and cause the inverter 9 to operate within this range. In the present embodiment, in the heating operation mode, by changing the voltage phase command θ faster than in the normal operation mode, it is possible to output a high-frequency alternating-current voltage having a frequency equal to or higher than several kilohertz and energize the compressor motor 8 (high-frequency energization) to perform a locked operation.

The configuration and the operation of the high-frequency-voltage-phase-command generating unit 16 in the heat pump device 100 according to the first embodiment are explained with reference to FIGS. 7 to 10.

Figure 7:
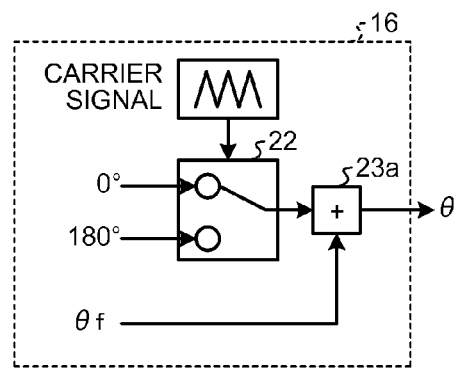
FIG. 7 is a diagram illustrating a configuration example of a high-frequency-voltage-phase-command generating unit in the heat pump device according to the first embodiment.
Figure 8:
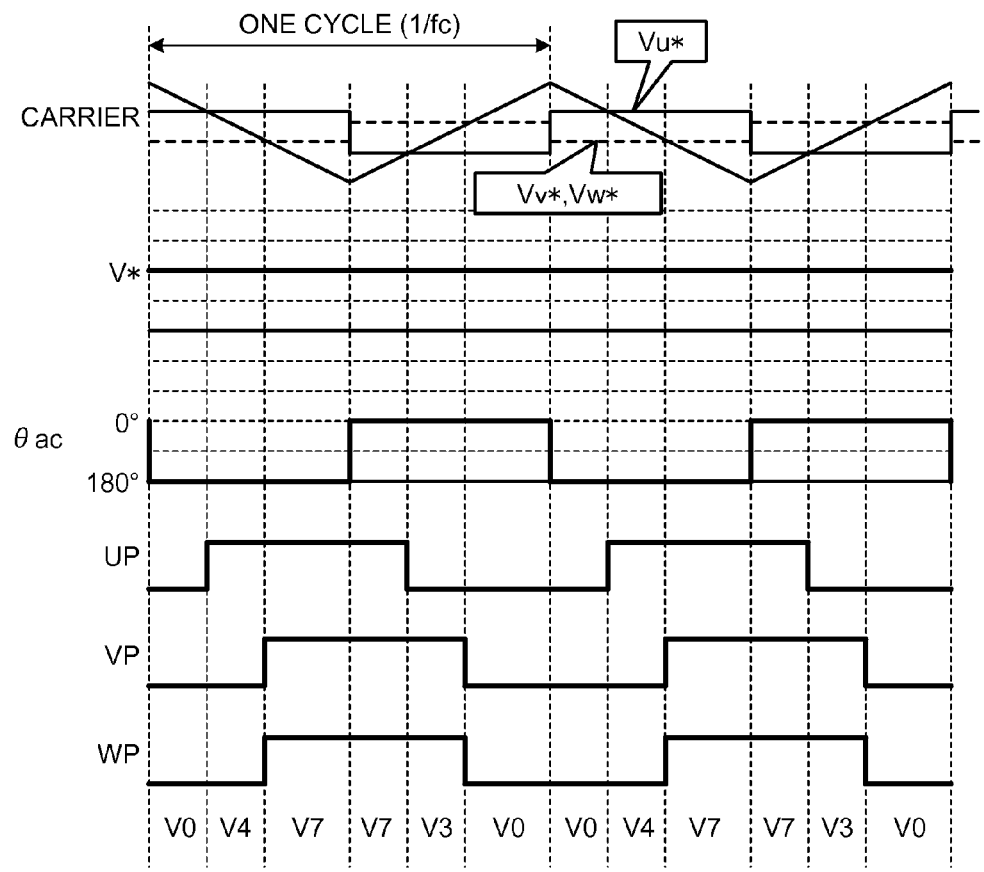
FIG. 8 is a diagram illustrating signal waveforms during locked energization in the heat pump device according to the first embodiment.

FIG. 7 is a diagram illustrating a configuration example of the high-frequency-voltage-phase-command generating unit in the heat pump device according to the first embodiment. FIG. 8 is a diagram illustrating signal waveforms during the locked energization in the heat pump device according to the first embodiment.

As illustrated in FIG. 7, the high-frequency-voltage-phase-command generating unit 16 in the first embodiment includes a high-frequency-voltage-phase inverting unit 22, which inverts the high-frequency-voltage phase command θ in synchronization with a carrier signal, and an adder 23a, which adds a reference phase θf to the output of the high-frequency-voltage-phase inverting unit 22.

In the case of general inverters, the carrier frequency, which is the frequency of the carrier signal, has an upper limit due to the switching speed of the switching elements of the inverters. Therefore, it is difficult to output a high-frequency voltage having a frequency equal to or higher than the carrier frequency, which is a carrier wave. Note that, in the case of general IGBTs (Insulated Gate Bipolar Transistors), the upper limit of the switching speed is about 20 kilohertz.

When the frequency of the high-frequency voltage is equal to or higher than about ⅒ of the carrier frequency, adverse effects may occur such as deterioration of the waveform output accuracy of the high-frequency voltage and superposition of DC components. In view of the above, when the carrier frequency is set to 20 kilohertz, if the frequency of the high-frequency voltage is set to be equal to or lower than ⅒ of the carrier frequency, the frequency of the high-frequency voltage is equal to or lower than 2 kilohertz, then the frequency of the high-frequency voltage falls within the audible frequency range. Therefore, noise due to electromagnetic sound of the compressor motor is a problem.

Therefore, in the present embodiment, as illustrated in FIG. 8, the high-frequency-voltage phase command θ is inverted 180° every time period, which is from the top point to the bottom point of the carrier signal, i.e., every cycle of a carrier frequency fc (1/fc). With such a configuration, the voltage command values Vu*, Vv*, and Vw* inverted in synchronization with the carrier signal are obtained in the voltage-command calculating unit 19 in a later stage. Further, the highly accurate PWM signals UP, VP, WP, UN, VN, and WN synchronizing with the carrier signal are generated in the PWM-signal generating unit 20 in a still later stage. At this point, the voltage vector changes in the order of V0 (UP=VP=WP=0), V4 (UP=1, VP=WP=0), V7 (UP=VP=WP=1), V3 (UP=0, VP=WP=1), V0 (UP=VP=WP=0), . . . .

Figure 9:
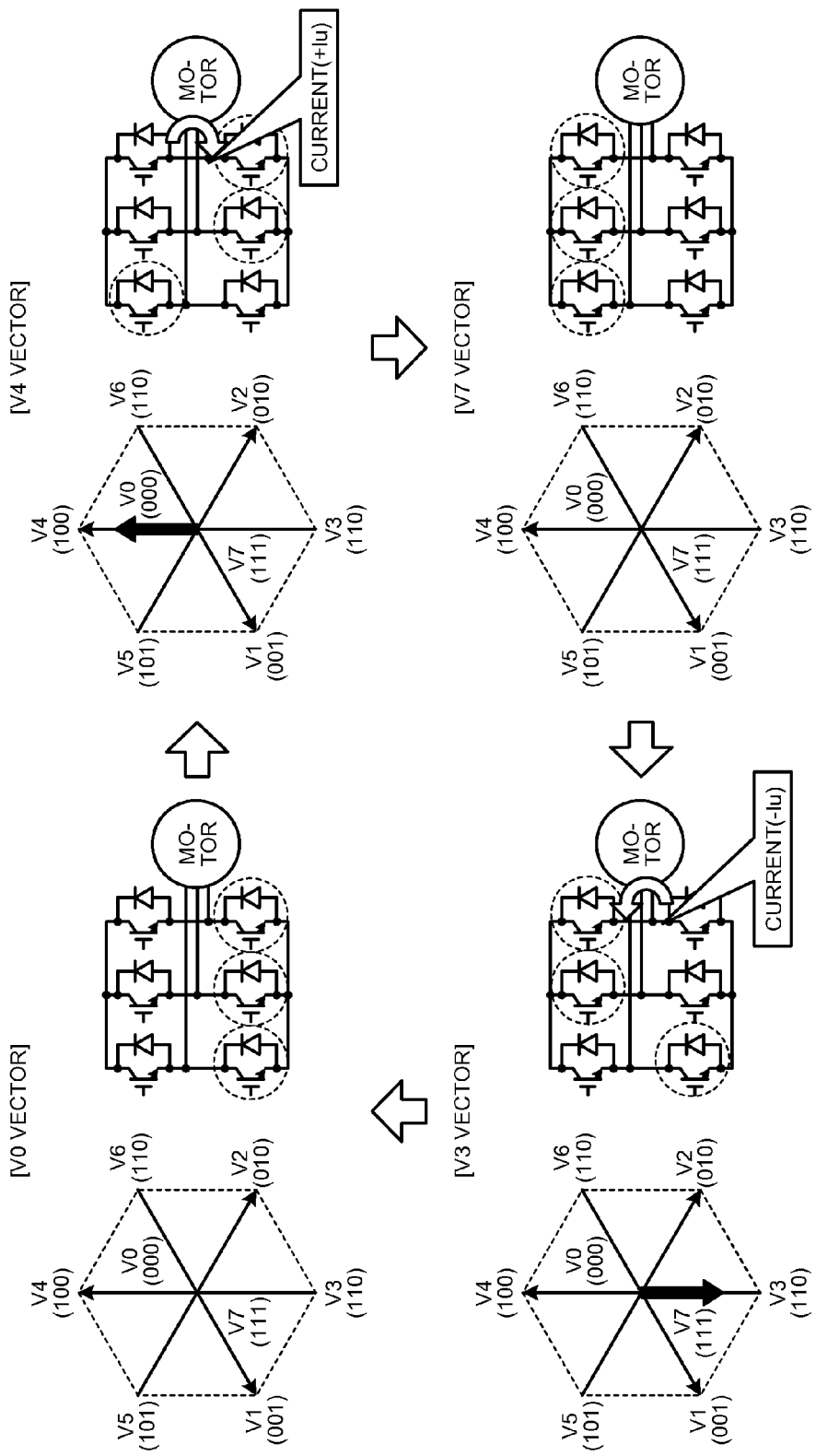
FIG. 9 is a diagram illustrating ON/OFF states of switching elements in an inverter corresponding to voltage vectors.

FIG. 9 is a diagram illustrating the ON/OFF states of the switching elements in the inverter corresponding to the voltage vectors. In the circuit diagrams illustrated in FIG. 9, the switching elements surrounded by broken lines are ON and the other switching elements are OFF. The rotation direction of the thick arrow indicating the changing order of the voltage vectors (the rotation direction of the voltage vectors V0→V4→V7→V3→0 . . . ) corresponds to the example illustrated in FIG. 9.

In the example illustrated in FIG. 9, the PWM signals UP, VP, WP, UN, VN, and WN go around four circuit states illustrated in FIG. 9 once during one carrier cycle. Consequently, an electric current having a cycle equivalent to one carrier cycle is fed to the compressor motor 8.

As illustrated in FIG. 9, when the V0 vector or the V7 vector is applied, the lines of the compressor motor 8 are short-circuited and any voltage is not output. In this case, the energy accumulated in the inductance of the compressor motor 8 changes to an electric current and flows through a short circuit. When the V4 vector is applied, an electric current (+Iu) in the U-phase direction flowing into the compressor motor 8 via the U phase and flowing out from the compressor motor 8 via the V phase and the W phase flows. When the V3 vector is applied, an electric current (−Iu) in the −U-phase direction flowing into the compressor motor 8 via the V phase and the W phase and flowing out from the compressor motor 8 via the U phase flows to the windings of the compressor motor 8. That is, when the V4 vector is applied, the electric current flows to the windings of the compressor motor 8 in the opposite direction to the case when the V3 vector is applied. Because the voltage vectors change in the order of V0, V4, V7, V3, V0, . . . , +Iu and −Iu alternately flow to the windings of the compressor motor 8. As a result, as illustrated in FIG. 9, the V4 vector and the V3 vector appear during one carrier cycle. Therefore, it is possible to apply a high-frequency voltage synchronizing with the frequency of the carrier signal to the windings of the compressor motor 8.

Because the V4 vector and the V3 vector are alternately output, +Iu and −Iu alternately flow to the windings of the compressor motor 8. Therefore, positive torque and negative torque are instantaneously switched. Therefore, the positive torque and the negative torque cancel each other out. Therefore, it is possible to apply a voltage that suppresses vibrations of the rotor.

The reference phase θf with respect to the carrier signal of the high-frequency-voltage phase command θ is desirably a multiple of 60°. The reason for this is explained below.

Figure 10:
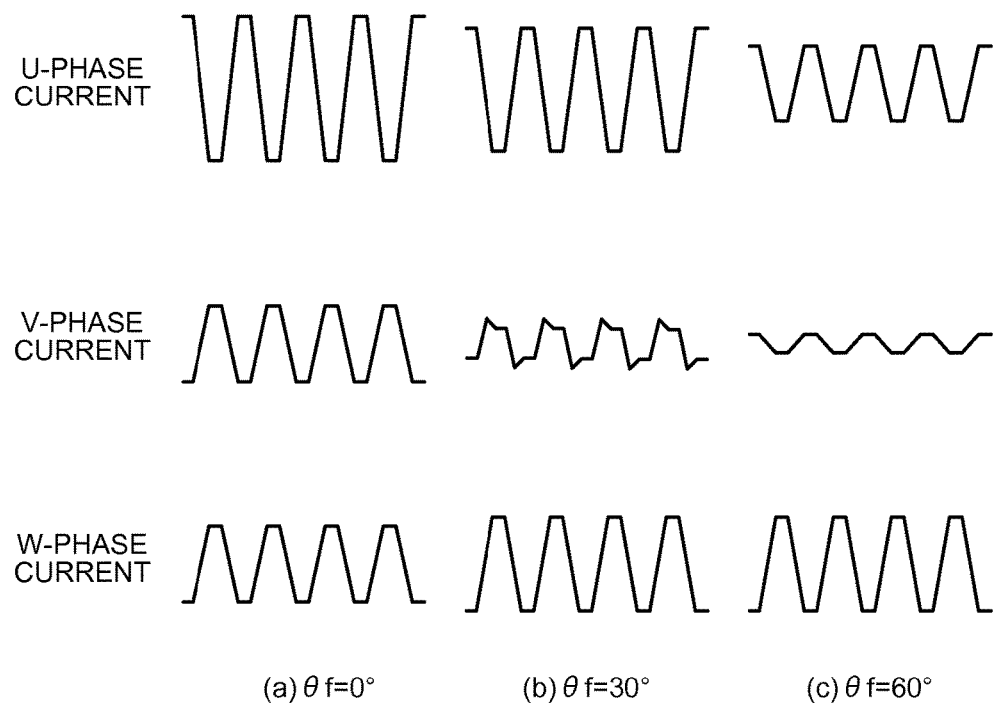
FIG. 10 is a diagram illustrating respective phase current waveforms when a reference phase θf is 0°, 30°, and 60°.

FIG. 10 is a diagram illustrating respective phase current waveforms obtained when the reference phase θf is 0°, 30°, and 60°. FIG. 10(a) illustrates respective phase current waveforms obtained when θf=0°. FIG. 10(b) illustrates respective phase current waveforms obtained when θf=30°. FIG. 10(c) illustrates respective phase current waveforms obtained when θf=60°.

When θf=0°, as illustrated in FIG. 9, only one other voltage vector (a voltage vector with which one switching element on the positive voltage side and two switching elements on the negative voltage side or two switching elements on the positive voltage side and one switching element on the negative voltage side are in an ON state) is generated between the V0 vector and the V7 vector. In this case, as illustrated in FIG. 10(a), the respective phase current waveforms are formed in a trapezoidal shape and an electric current having a small number of harmonic components is obtained.

When θf=60°, as in the case of θf=0°, only one other voltage vector is generated between the V0 vector and the V7 vector. Therefore, as illustrated in FIG. 10(c), the respective phase current waveforms are formed in a trapezoidal shape and an electric current having a small number of harmonic components is obtained.

However, when θf=30°, two different voltage vectors are generated between the V0 vector and the V7 vector. As illustrated in FIG. 10(b), the respective phase current waveforms are distorted and an electric current having many harmonic components is obtained. The distortion of the respective phase current waveforms may cause motor noise, motor shaft vibration, and the like.

That is, if the reference phase θf is a multiple of 60° and the high-frequency-voltage phase command θ is always a multiple of 60°, only one other voltage vector is generated between the V0 vector and the V7 vector. Therefore, respective phase current waveforms are trapezoidal shapes and an electric current with a small number of high-frequency components is obtained. In contrast, when the reference phase θf is other than a multiple of 60°, the high-frequency-voltage phase command θ is not a multiple of 60°. Therefore, two other voltage vectors are generated between the V0 vector and the V7 vector. Thus, the respective phase current waveforms are distorted and an electric current with many high-frequency components is obtained. Therefore, the reference phase θf is desirably a multiple of 60° such as 0°, 60°, 120°, . . . .

The relation between the stop position of the rotor of the compressor motor 8 and the amount of heat during the locked energization is explained with reference to FIGS. 11 and 12.

Figure 11:
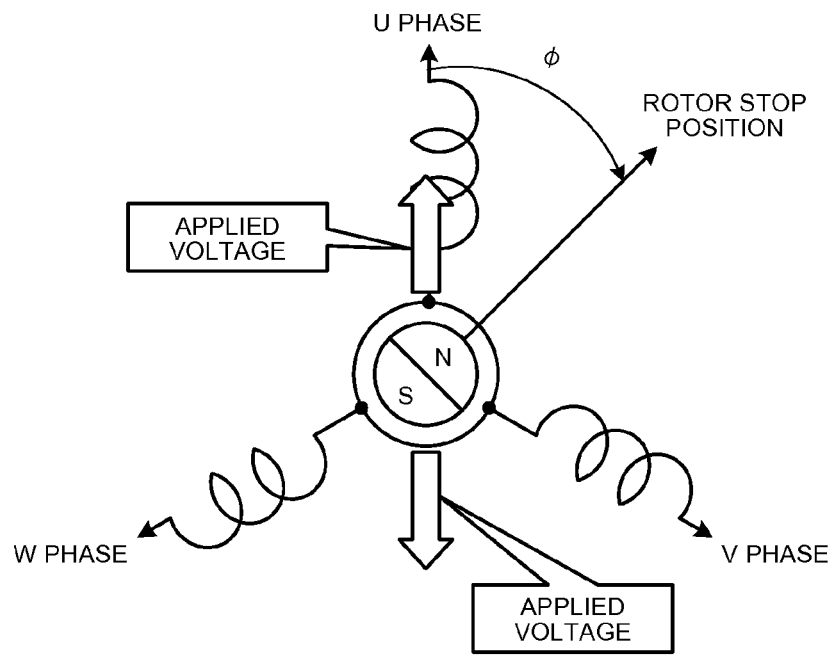
FIG. 11 is a diagram illustrating an example of the stop position of a rotor of an IPM motor.

FIG. 11 is a diagram illustrating an example of the stop position of the rotor of an IPM motor. When the compressor motor 8 is an IPM Motor (Interior Permanent Magnet Motor), as illustrated in FIG. 11, the stop position of the rotor of the compressor motor 8 is represented by the size of an angle φ of the shift of the direction of the N pole of the rotor from the U-phase direction.

Figure 12:
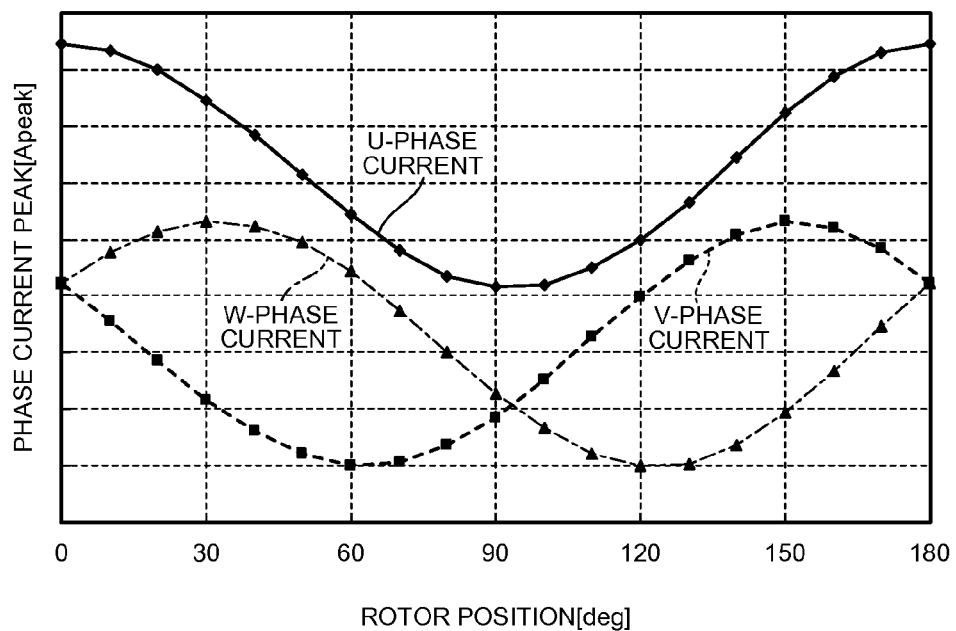
FIG. 12 is a diagram illustrating a relation between the position of the rotor and respective phase currents.

FIG. 12 is a diagram illustrating a relation between the position of the rotor and the respective phase currents. In the case of the IPM motor, the winding inductance value during high-frequency energization depends on the position of the rotor. Therefore, the winding impedance represented by a product of an electric angle frequency ω and the winding inductance value fluctuates according to the position of the rotor. Therefore, when the locked energization of the compressor motor 8 is carried out while the compressor is under operation standby, even when the same voltage is applied, an electric current flowing to the windings of the compressor motor 8 fluctuates according to the stop position of the rotor. Therefore, the amount of heat changes. As a result, depending on the stop position of the rotor, a large amount of power may be consumed to obtain the necessary amount of heat. Moreover, it is likely that the liquid refrigerant cannot be discharged from the inside of the compressor 1 because of insufficient heating and the inverter control unit 10 shifts to the normal operation mode in a state in which the liquid refrigerant is stagnated in the compressor 1. Therefore, when the locked energization of the compressor motor 8 is performed, it is necessary to keep the amount of power supplied to the compressor motor 8 constant and keep the amount of heat of the compressor 1 constant irrespective of the stop position of the rotor.

As a method of keeping the amount of power supplied to the compressor motor 8 constant, when respective inter-phase voltages, respective phase voltages, or respective phase currents of the compressor motor 8 are detected and the power value obtained from the detection values is controlled to be fixed, it is necessary to highly accurately detect the detection values. However, in a microcomputer or the like generally used as the inverter control unit 10, even when sufficient detection accuracy is obtained within a range of several tens of hertz to several hundreds of hertz during the normal operation, as explained above, it is likely that sufficient detection accuracy is not obtained when a high-frequency voltage having a frequency higher than the frequency during the normal operation is supplied to the compressor motor 8 and the locked energization of the compressor motor 8 is carried out, for example, when high-frequency energization synchronizing with the carrier signal is carried out.

For example, when it is assumed that the high-frequency energization frequency when the locked energization is carried out is 20 kilohertz, one high-frequency energization cycle is 50 microseconds. However, when the A/D (analog/digital) conversion time of the microcomputer is several microseconds, detection points per high-frequency energization cycle are several points; therefore, the detection accuracy is deteriorated.

Therefore, in the present embodiment, as explained above, on the basis of the respective inter-phase voltages, respective phase voltages, or respective phase currents of the compressor motor 8 for a plurality of high-frequency energization cycles when the locked energization is performed, the respective inter-phase voltages, respective phase voltages, or respective phase currents for one high-frequency energization cycle are restored. Consequently, even when the inverter control unit 10 is configured using the microcomputer having a long A/D conversion time with respect to the high-frequency energization frequency when the locked energization is performed, it is possible to improve the detection accuracy of the detection values for one high-frequency energization cycle. The power value supplied to the compressor motor 8 is calculated using the restored detection values for one high-frequency energization cycle. The power value is controlled such that it coincides with the heating power command necessary for discharging the liquid refrigerant stagnated in the compressor 1 to the outside of the compressor 1. Consequently, it is possible to keep the amount of power supplied to the compressor motor 8 constant and keep the amount of heat of the compressor 1 constant irrespective of the stop position of the rotor. It is possible to more reliably discharge the liquid refrigerant stagnated in the compressor 1 from the inside of the compressor 1 with minimum power.

Detailed configurations and operations of the sections of the locked-energization control unit 12 for realizing the control explained above are explained with reference to FIG. 13 to FIG. 20.

Figure 13:
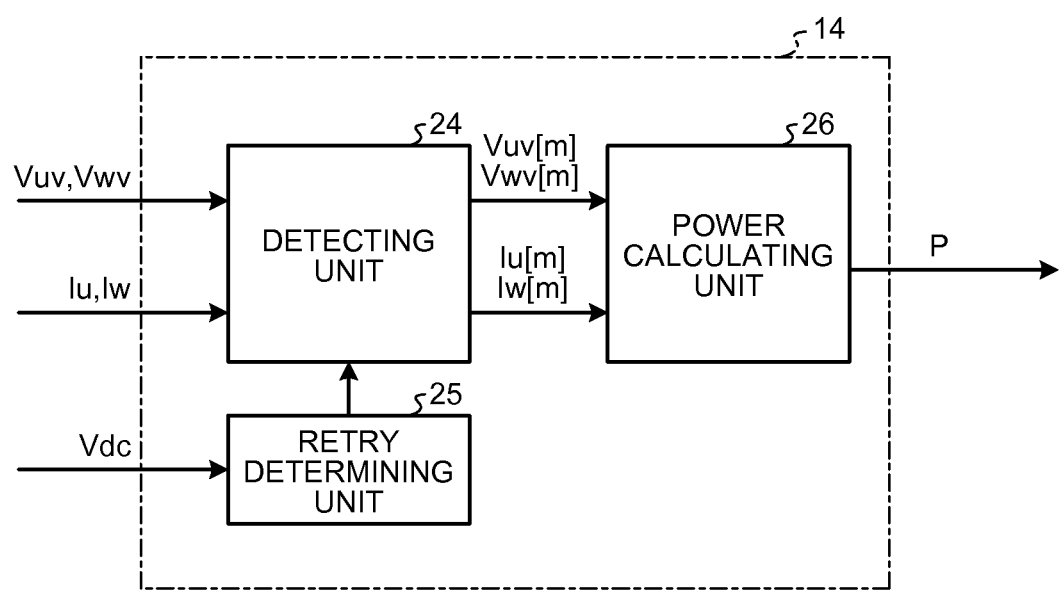
FIG. 13 is a diagram illustrating an example of a detailed configuration of a power calculating unit in the heat pump device according to the first embodiment.

FIG. 13 is a diagram illustrating an example of a detailed configuration of the power calculating unit in the heat pump device according to the first embodiment. In the example illustrated in FIG. 13, the power calculating unit 14 includes a detecting unit 24, a retry determining unit 25, and a power operating unit 26.

First, an example is explained in which a two-power meter method generally used as a measuring method for three-phase power is used.

When the two-power meter method is used, the power value P is represented like Equation (4) below using, for example, respective line voltages Vuv and Vwv, a U-phase current Iu, and a W-phase current Iw.

$$P = Vuv \times Iu + Vwv \times Iw \quad (4)$$

The configuration is such that, according to the above Equation (4), the detecting unit 24 detects the respective line voltages Vuv and Vwv, the U-phase current Iu, and the W-phase current Iw.

Figure 14:
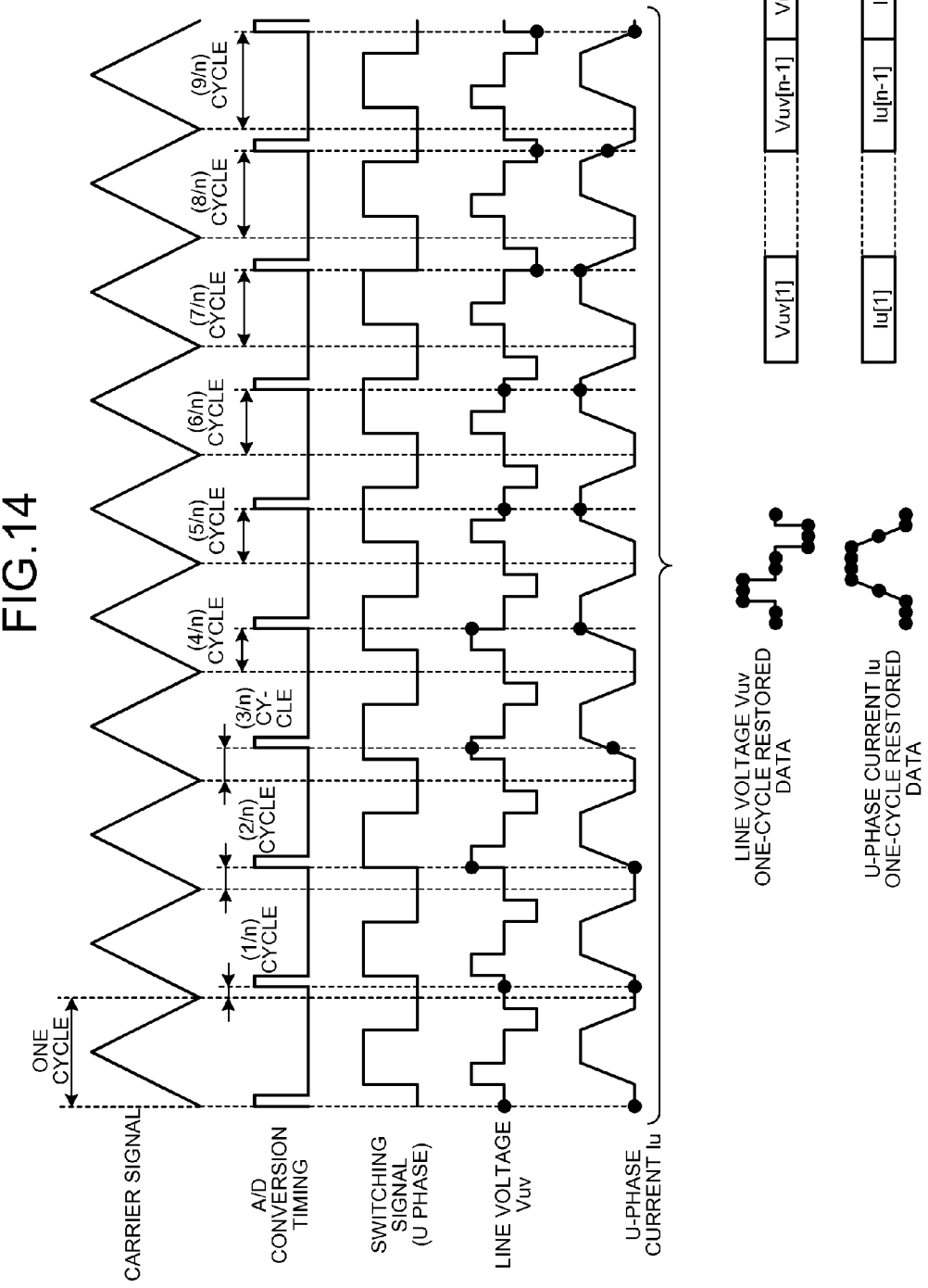
FIG. 14 is a diagram illustrating signal waveforms for explaining a method of detecting respective line voltages and respective phase currents in the heat pump device according to the first embodiment.

FIG. 14 is a diagram illustrating signal waveforms for explaining a method of detecting respective line voltages and respective phase currents in the heat pump device according to the first embodiment. As explained above, in the present embodiment, the voltage commands Vu*, Vv*, and Vw* during the heating operation mode synchronize with a carrier signal, which is a reference signal. Therefore, as illustrated in FIG. 14, the respective line voltages Vuv and Vwv, the U-phase current Iu, and the W-phase current Iw have signal waveforms synchronizing with the carrier signal.

In the present embodiment, the detecting unit 24 detects the respective line voltages Vuv and Vwv, the U-phase current Iu, and the W-phase current Iw while shifting a phase by a (1/n) carrier cycle at a time over n carrier cycles (in the example illustrated in FIG. 14, ten carrier cycles) and calculates the power value P for one carrier cycle using these detection values.

More specifically, as illustrated in FIG. 14, in the first cycle, the detecting unit 24 performs A/D conversion at the bottom point of the carrier signal and detects instantaneous values Vuv [1] and Vwv [1] of the respective line voltages, an instantaneous value Iu [1] of the U-phase current, and an instantaneous value Iw [1] of the W-phase current. Subsequently, in the second cycle, the detecting unit 24 performs A/D conversion at the timing that is the (1/n) carrier cycle later than the bottom point of the carrier signal and detects instantaneous values Vuv [2] and Vwv [2] of the respective line voltages, an instantaneous value Iu [2] of the U-phase current, and an instantaneous value Iw [2] of the W-phase current. Thereafter, in the m-th cycle (m is an integer of 1 to (n−1)), the detecting unit 24 performs A/D conversion at the timing that is a (m/n) carrier cycle later than the bottom point of the carrier signal and detects instantaneous values Vuv [m] and Vwv [m] of the respective line voltages, an instantaneous value Iu [m] of the U-phase current, and an instantaneous value Iw [m] of the W-phase current. In this way, the detecting unit 24 changes the A/D conversion timing by the (1/n) carrier cycle at a time over the n carrier cycles and obtains a one-carrier-cycle data array Vuv [n], Vwv [n], Iu [n], and Iw [n]. Consequently, it is possible to restore the respective line voltages Vuv and Vwv, the U-phase current Iu, and the W-phase current Iw for one carrier cycle, i.e., one high-frequency energization cycle.

Figure 15:
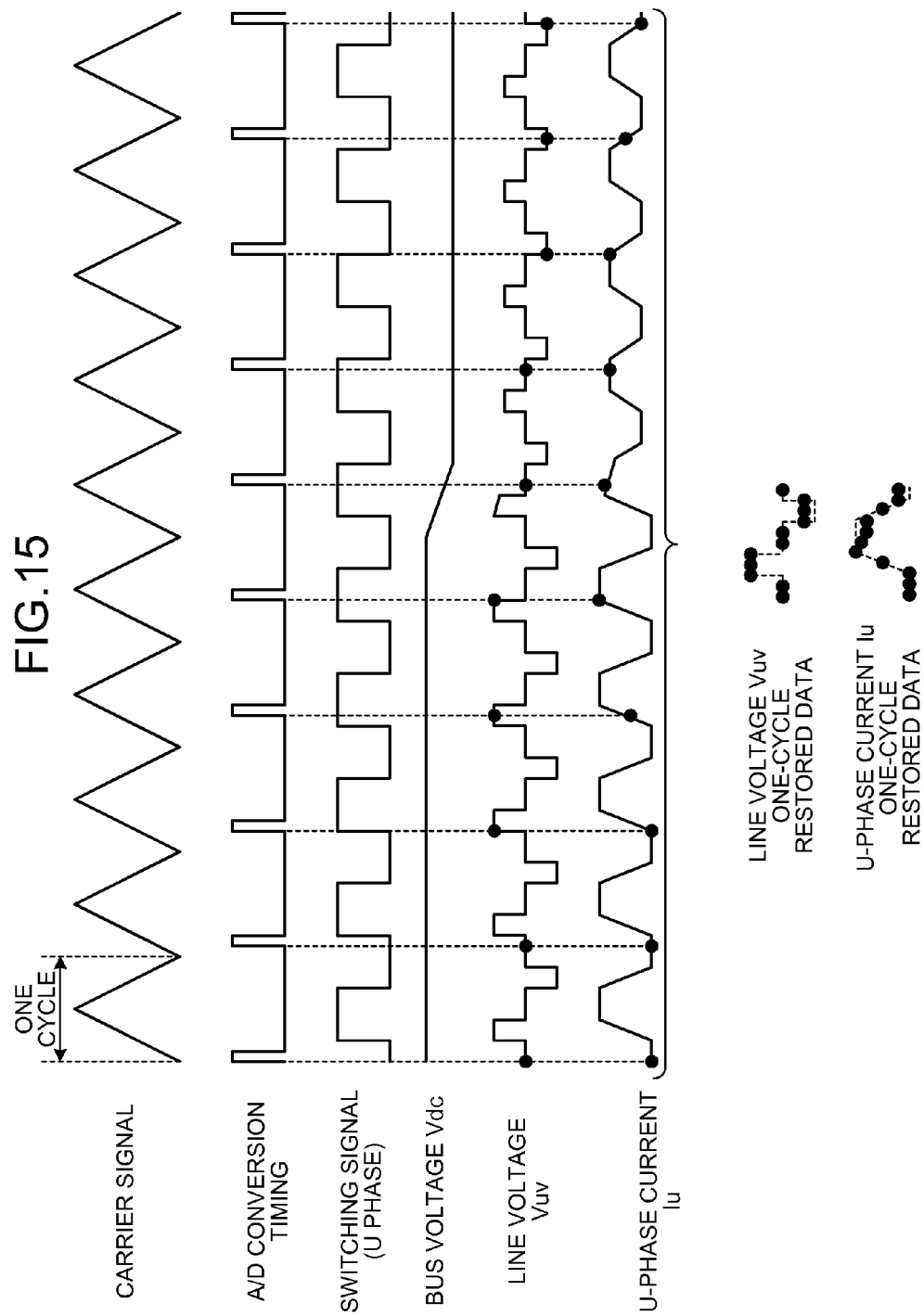
FIG. 15 is a diagram illustrating signal waveforms when a bus voltage value of the inverter fluctuates.
Figure 16:
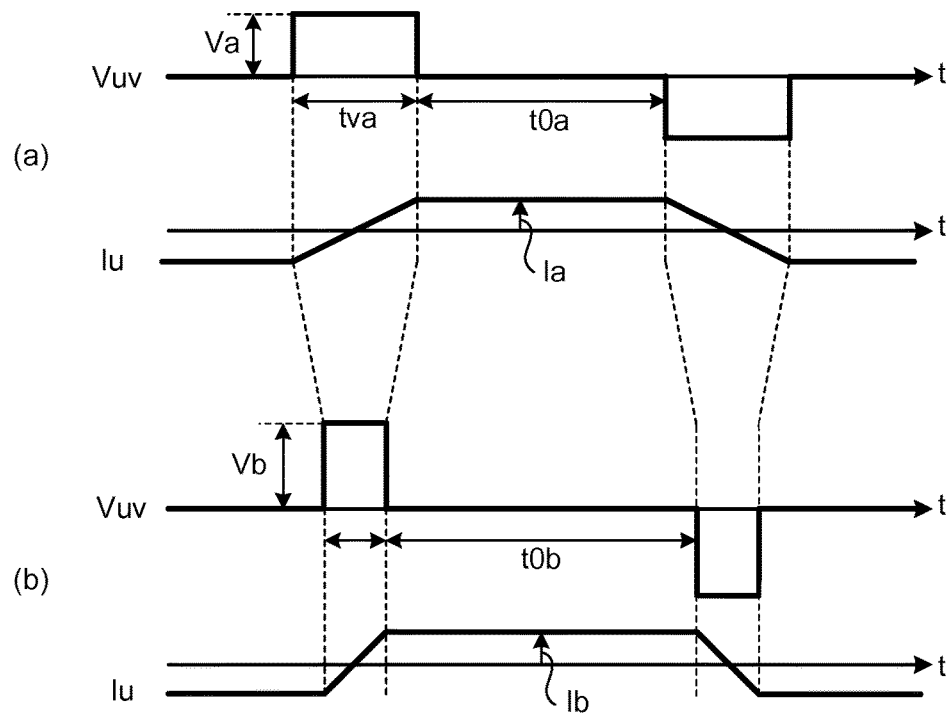
FIG. 16 is a diagram illustrating differences in the line voltage waveform and the phase current waveform depending on the difference in magnitude of the bus voltage value of the inverter.

An operation performed when the bus voltage value of the inverter 9, i.e., the voltage value Vdc of the direct-current voltage source 11 illustrated in FIG. 1 fluctuates is explained. FIG. 15 is a diagram illustrating signal waveforms when the bus voltage value of the inverter fluctuates. FIG. 16 is a diagram illustrating differences in the line voltage waveform and the phase current waveform depending on the difference in magnitude of the bus voltage value of the inverter. FIG. 16(a) illustrates the waveform of the line voltage Vuv and the waveform of the U-phase current Iu obtained when the bus voltage value Vdc of the inverter is small. FIG. 16(b) illustrates the waveform of the line voltage Vuv and the waveform of the U-phase current Iu obtained when the bus voltage value Vdc of the inverter is large.

If the bus voltage value Vdc of the inverter 9 fluctuates while the detecting unit 24 is detecting the detection values from the first carrier cycle to the n-th cycle, the respective line voltage values and the respective phase current values also fluctuate according to the fluctuation in the bus voltage value Vdc of the inverter 9 as illustrated in FIG. 15. Therefore, the restoration accuracy of the detection values for one carrier cycle is deteriorated.

As illustrated in FIG. 16, the line voltage Vuv is controlled such that the value of Va×tva illustrated in FIG. 16(a) and the value of Vb×tvb illustrated in FIG. 16(b) substantially coincide with each other. On the other hand, with regard to the U-phase current, the value of Ia illustrated in FIG. 16(a) and the value of Ib illustrated in FIG. 16(b) substantially coincide with each other and Ia×t0a<Ib×t0b. That is, because the phase current is larger as the bus voltage value Vdc is larger, the power input to the compressor motor 8 fluctuates according to the magnitude of the buss voltage value Vdc.

Therefore, in the present embodiment, when the retry determining unit 25 detects that the bus voltage value Vdc fluctuates in excess of a predetermined range (e.g., ±10%) during the detection of the detection values, the detecting unit 24 discards the detection values that have been detected and restarts the detection of detection values starting from the first carrier cycle. By performing such control, it is possible to suppress the influence of the fluctuation in the bus voltage value Vdc on the detection accuracy of the power value P.

Note that, in the example explained above, the fluctuation in the bus voltage value Vdc of the inverter 9 is sensed and the restoring operation for the detection values for one carrier cycle is retried. However, it is possible to sense, other than the fluctuation in the bus voltage value Vdc of the inverter 9, an event causing the fluctuation in the detection values and retry the restoring operation for the detection values for one carrier cycle.

Figure 17:
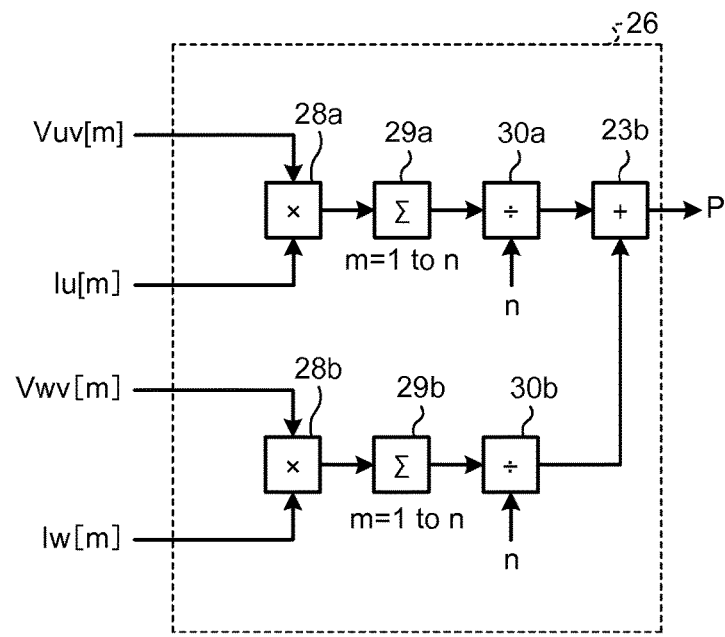
FIG. 17 is a diagram illustrating an example of a detailed configuration of a power calculating unit in the heat pump device according to the first embodiment.

FIG. 17 is a diagram illustrating an example of a detailed configuration of the power calculating unit in the heat pump device according to the first embodiment. In the example illustrated in FIG. 17, a configuration in which the two-power meter method is used is illustrated. The power operating unit 26 is configured to include multipliers 28a and 28b, summation computing units 29a and 29b, dividers 30a and 30b, and an adder 23b.

The instantaneous values Vuv [m] and Vwv [m] of the respective line voltages, the instantaneous value Iu [m] of the U-phase current, and the instantaneous value Iw [m] of the W-phase current detected by the detecting unit 24 are input to the power operating unit 26.

The multiplier 28a calculates a product of Vuv [m] and Iu [m]. The summation computing unit 29a calculates the sum of the sample m=1 to n. The divider 30a divides the product of Vuv [m] and Iu [m] by the number of samples n to calculate the average of the product.

The multiplier 28*b* calculates a product of Vwv [m] and Iw [m]. The summation computing unit 29*b* calculates the sum of the sample m=1 to n. The divider 30*b* divides the product of Vwv [m] and Iw [m] by the number of samples n to calculate the average of the product.

The adder 23*b* adds the output of the divider 30*a* and the output of the divider 30*b* to calculate the power value P input to the compressor motor 8.

Figure 18:
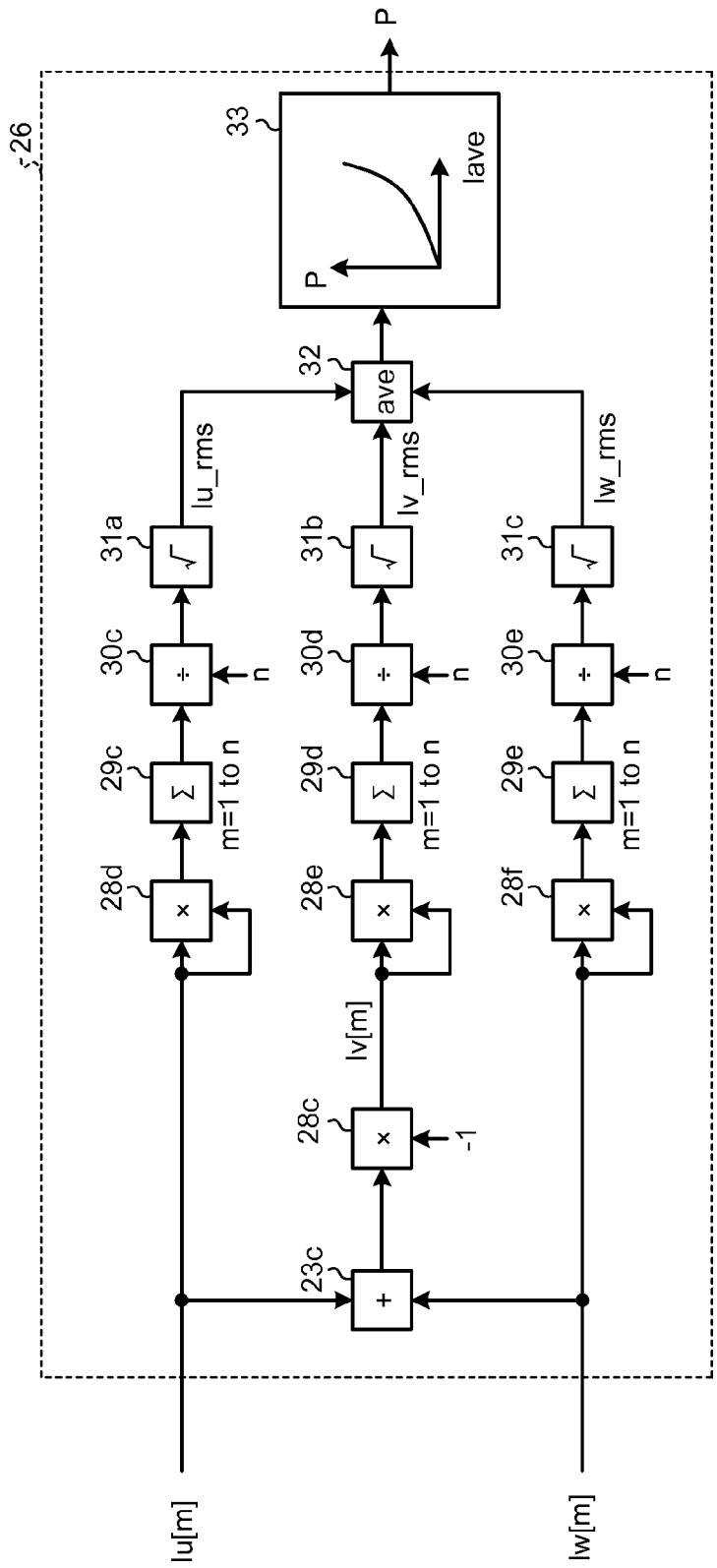
FIG. 18 is a diagram illustrating an example of a detailed configuration different from the detailed configuration illustrated in FIG. 17 of the power calculating unit in the heat pump device according to the first embodiment.

FIG. 18 is a diagram illustrating an example of a detailed configuration different from FIG. 17 of the power calculating unit in the heat pump device according to the first embodiment.

Besides the method of using the two-power meter method explained above, for example, a method of measuring three-phase power can also be represented like Equation (5) below using the respective phase voltages Vu, Vv, and Vw and the respective phase currents Iu, Iv, and Iw.

$$P = Vu \times Iu + Vv \times Iv + Vw \times Iw \qquad (5)$$

In this case, there is a demerit that detection parameters increase. When the law of Kirchhoff indicating that the sum of the instantaneous values Iu [m], Iv [m], and Iw [m] of the respective phase currents is zero in the three-phase power is used, for example, the U-phase current Iu and the W-phase current Iw are detected and the instantaneous value Iv [m] of the V-phase current can be represented using the instantaneous value Iu [m] of the U-phase current and the instantaneous value Iw [m] of the W-phase current as indicated by Equation (6).

$$Iv[m] = -Iu[m] - Iw[m] \qquad (6)$$

The power value P input to the compressor motor 8 is uniquely determined with respect to the average Iave of the root-mean-square values of the respective phase currents.

That is, the power value P input to the compressor motor 8 can be calculated using the phase currents for two phases (in this example, the U-phase current Iu and the W-phase current Iw).

In the example illustrated in FIG. 18, a configuration is illustrated in which the above Equation (6) and a relation between and the average Iave of the root-mean-square values of the respective phase currents and the power value P input to the compressor motor 8 are used. The power operating unit 26 is configured to include an adder 23*c*, multipliers 28*c* to 28*f*, summation computing units 29*c* to 29*e*, dividers 30*c* to 30*e*, square-root computing units 31*a* to 31*c*, an average computing unit 32, and a current/power converter 33.

The current/power converter 33 retains, as a conversion table, the relation between the average Iave of the root-mean-square values of the respective phase currents obtained by an experiment, a simulation, or the like in advance and the power value P input to the compressor motor 8.

The instantaneous value Iu [m] of the U-phase current and the instantaneous value Iw [m] of the W-phase current detected by the detecting unit 24 are input to the power operating unit 26.

The adder 23*c* adds Iu [m] and Iw [m]. The multiplier 28*c* inverts a sign to obtain the instantaneous value Iv [m] of the V-phase current.

The multiplier 28*d* squares Iu [m]. The summation computing unit 29*c* calculates the sum of the values of the sample m=1 to n. The divider 30*c* divides the sum by the number of samples n. The square-root computing unit 31*a* obtains a square root. Consequently, a root-mean-square value Iu_rms of the U-phase current is calculated.

The multiplier 28*e* squares Iv [m]. The summation computing unit 29*d* calculates the sum of the values of the sample m=1 to n. The divider 30*d* divides the sum by the number of samples n. The square-root computing unit 31*b* obtains a square root. Consequently, a root-mean-square value Iv_rms of the V-phase current is calculated.

The multiplier 28*f* squares Iw [m]. The summation computing unit 29*e* calculates the sum of the values of the sample m=1 to n. The divider 30*e* divides the sum by the number of samples n. The square-root computing unit 31*c* obtains a square root. Consequently, a root-mean-square value Iw_rms of the W-phase current is calculated.

The average computing unit 32 calculates the average Iave of Iu_rms, Iv_rms, and Iw_rms. The current/power converter 33 converts the average Iave into the power value P using the conversion table explained above.

Figure 19:
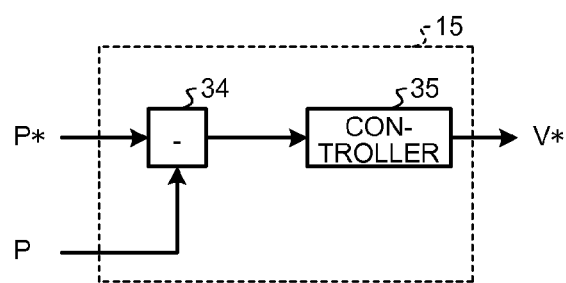
FIG. 19 is a diagram illustrating an example of a detailed configuration of a high-frequency-voltage-command generating unit in the heat pump device according to the first embodiment.

FIG. 19 is a diagram illustrating an example of a detailed configuration of the high-frequency-voltage-command generating unit in the heat pump device according to the first embodiment. In the example illustrated in FIG. 19, the high-frequency-voltage-command generating unit 15 is configured to include a subtractor 34 and a controller 35.

The power value P calculated by the power calculating unit 14 and the heating power command P* generated by the heating-power-command generating unit 17 are input to the high-frequency-voltage-command generating unit 15.

The subtractor 34 calculates a deviation between the power value P and the heating power command P*. The controller 35 controls the high-frequency voltage command V* such that the deviation becomes zero.

Note that, it goes without saying that the controller 35 can be configured by a proportional controller, an integral controller, or a differential controller generally used in control or a combination of the controllers. The present invention is not limited by the configuration of the controller 35.

Figure 20:
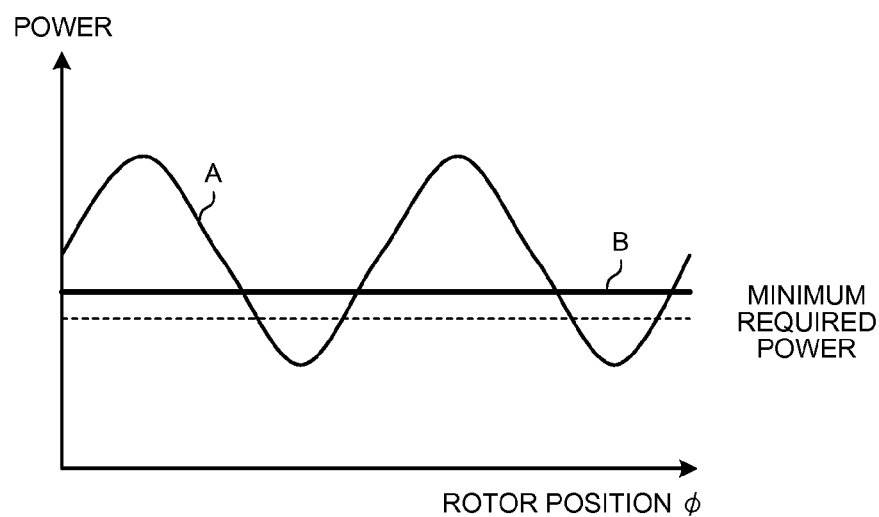
FIG. 20 is a diagram illustrating a comparative example of constant voltage control and control according to the first embodiment.

FIG. 20 is a diagram illustrating a comparative example of constant voltage control and the control according to the first embodiment. In FIG. 20, the horizontal axis indicates a position φ of the rotor of the compressor motor 8 and the vertical axis indicates power supplied to the compressor motor 8. The character "A" illustrated in FIG. 20 indicates an example in which the locked energization of the compressor motor 8 is carried out by the constant voltage control. The character "B" illustrated in FIG. 20 indicates an example in which the locked energization of the compressor motor 8 is carried out by the constant power control explained in the present embodiment.

In a motor that effectively uses reluctance torque such as an IPM motor or a synchronous reluctance motor, inductance greatly fluctuates according to the position φ of the rotor. Therefore, impedance greatly changes according to the position φ of the rotor. Therefore, when the locked energization of the compressor motor 8 is carried out by the constant voltage control (A in FIG. 20), the power supplied to the compressor motor 8 greatly fluctuates. Depending on the position φ of the rotor, excess power is supplied to the compressor motor 8 or the power is smaller than minimum power required for discharging the liquid refrigerant stagnated in the compressor 1.

In contrast, in the present embodiment (B in FIG. 20), the power supplied to the compressor motor 8 is controlled to be fixed. Therefore, it is possible to efficiently and reliably heat the liquid refrigerant stagnated in the compressor 1 and discharge the liquid refrigerant to the outside of the compressor 1 irrespective of the rotor position φ.

As explained above, with the heat pump device in the first embodiment, while the compressor is under operation standby, the high-frequency voltage synchronizing with the carrier signal is supplied to the compressor motor to carry out the locked energization of the compressor motor. From the respective inter-phase voltages, respective phase voltages, or respective phase currents detected while shifting the phase by the (1/n) cycle at a time over the n cycles (n is an integer equal to or larger than 2) of the carrier signal, the respective inter-phase voltages, respective phase voltages, or respective phase currents for one carrier cycle are restored. The power value calculated using the restored detection values for one carrier cycle is controlled to coincide with the heating power command necessary for discharging the liquid refrigerant stagnated in the compressor to the outside of the compressor. Therefore, even when the inverter control unit is configured using the microcomputer having a long A/D conversion time with respect to the high-frequency energization frequency when the locked energization is performed, it is possible to keep the amount of heat to the compressor constant and efficiently and reliably prevent the liquid refrigerant from stagnating in the compressor irrespective of the position of the rotor of the compressor motor.

Note that, in the first embodiment explained above, the example is explained in which the respective inter-phase voltages, respective phase voltages, or respective phase currents are detected while shifting the phase by the (1/n) cycle at a time over the n cycles (n is an integer equal to or larger than 2) of the carrier signal and the power value is calculated using the detection values for one cycle of the carrier signal. However, the order of detecting the detection values and the number of detection values are not limited to this. When detection values are detected over the n cycles of the carrier signal, for example, detection values can be detected in phases each corresponding to a (m/n) cycle (m is a natural number equal to or smaller than n) for k cycles (k is any number equal to or smaller than n), such as even-numbered cycles or odd-numbered cycles, and the detection values can be regarded as detection values for one cycle of the carrier signal to calculate a power value. That is, when detection values are detected five times in ten cycles of the carrier signal, for example, the detection values can be respectively detected in a phase corresponding to a (4/10) cycle in a first cycle, in a phase corresponding to a (2/10) cycle in a fourth cycle, in a phase corresponding to a (6/10) cycle in a sixth cycle, in a phase corresponding to a (10/10) cycle in an eighth cycle, and in a phase corresponding to a (8/10) cycle in a tenth cycle.

In the first embodiment explained above, the example is explained in which the locked energization is performed by inverting the high-frequency-voltage phase command in synchronization with the carrier signal of the inverter and the detection values for one carrier cycle are restored. However, it goes without saying that the effects similar to the above can be obtained even with a configuration in which detection values for a predetermined range synchronizing with a carrier cycle, for example, a half carrier cycle or a plurality of cycles are restored. It goes without saying that the effects similar to the above can be obtained even with a configuration in which the high-frequency energization cycle when the locked energization is performed, i.e., the high-frequency-voltage phase command does not synchronize with the carrier signal or even with a configuration in which, from the respective inter-phase voltages, respective phase voltages, or respective phase currents of the compressor motor for a plurality of high-frequency energization cycles, the detection values for one high-frequency energization cycle or a predetermined range synchronizing with the high-frequency energization cycle are restored.

In the first embodiment explained above, the example is explained in which the locked energization of the compressor motor is carried out by the high-frequency energization. However, in the case of the high-frequency energization, when impedance is too high, it is difficult to obtain the necessary amount of heat. Therefore, when a large amount of heat is necessary, the configuration can be such that the locked energization of the compressor motor can be carried out using direct-current energization together with the high-frequency energization. With such a configuration, it is possible to more reliably vaporize the liquid refrigerant stagnated in the compressor and discharge the liquid refrigerant to the outside of the compressor.

There is a characteristic that, when a high-frequency voltage is applied to the compressor motor, an electric current less easily flows because impedance increases with an inductance component of the windings of the compressor motor. For example, in the normal operation mode, the respective phase currents flowing to the compressor motor are, in general, approximately several tens of amperes. On the other hand, in the heating operation mode, the phase currents are equal to or lower than several amperes. That is, in the normal operation mode and the heating operation mode, gains and frequency characteristics required of current detectors are different. Therefore, in the case of detecting the phase currents when performing the locked energization of the compressor motor with the high frequency energization using the current detector used in the normal operation mode, the detection accuracy may deteriorate. Therefore, it is preferable that the current detector used for the phase current detection in the normal operation mode and the current detector used for the phase current detection in the heating operation mode are separate current detectors having different gains and frequency characteristics. Alternatively, when one current detector is used in both of the normal operation mode and the heating operation mode, two kinds of gain and two kinds of frequency characteristics suitable for the respective modes can be given to the modes and they can be changed depending on whether the mode is the normal operation mode or the heating operation mode. The detection accuracy of the phase currents can be improved by taking measures to, for example, change the number of bits of the A/D detection of the microcomputer configuring the inverter control unit, for example, from ten bits to twelve bits.

Note that, concerning detection of line voltages and phase voltages, because a difference of voltage values is small between the normal operation mode and the heating operation mode, necessity of taking measures to, for example, provide a voltage detector for the heating operation mode that is different from a voltage detector for the normal operation mode is low. However, whereas the voltage frequency in the normal operation mode is several tens to several hundreds of hertz, the voltage frequency in the heating operation mode is several kilohertz. Therefore, when an LPF (Low Pass Filter) for removing high-frequency noise and the like is added, it is desirable to design the LPF according to the frequency in the heating operation mode, i.e., a high-frequency energization frequency when carrying out the locked energization of the compressor motor.

Further, when line voltages and phase currents are detected by the same microcomputer, there is a concern about an increase in costs because it is necessary to use a microcomputer having a high function because of an increase in processing speed of the microcomputer due to an increase in the number of detected line voltages and phase currents and a shortage of ports for A/D detection. In this case, for example, it is possible to reduce the number of detected line voltages and phase currents of the microcomputer by providing a multiplication circuit for calculating a product of the line voltages and the phase currents on the outside of the microcomputer. Therefore, it is possible to suppress an increase in costs of the microcomputer. In this case, it is possible to easily realize the suppression of the cost increase by using, as the multiplication circuit, for example, a multiplication circuit including an operational amplifier, an IC for multiplication generally available in the market, or the like.

Second Embodiment

In the present embodiment, an air conditioner, a heat pump water heater, a refrigerator, and a freezing machine to which the heat pump device described in the first embodiment can be applied are explained.

A more detailed configuration of a refrigeration cycle and operations in a normal operation mode of the air conditioner, the heat pump water heater, the refrigerator, and the freezing machine according to the second embodiment are explained with reference to FIG. 21 and FIG. 22.

Figure 21:
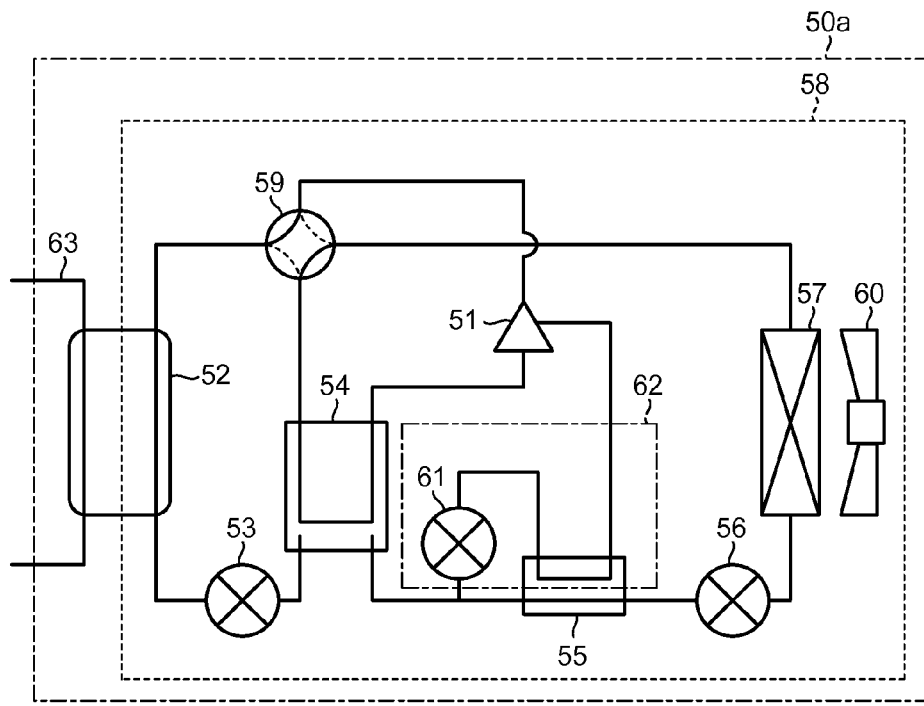
FIG. 21 is a diagram illustrating a configuration example of a refrigeration cycle according to a second embodiment.

FIG. 21 is a diagram of a configuration example of the refrigeration cycle according to the second embodiment. FIG. 22 is a Mollier chart of a state transition of a refrigerant in the refrigeration cycle illustrated in FIG. 21. In FIG. 22, the horizontal axis indicates a specific enthalpy h and the vertical axis indicates a refrigerant pressure P.

In a refrigeration cycle 50a according to the second embodiment, a compressor 51, a heat exchanger 52, an expansion mechanism 53, a receiver 54, an internal heat exchanger 55, an expansion mechanism 56, and a heat exchanger 57 are sequentially connected by a pipe to form a main refrigerant circuit 58 through which a refrigerant circulates. Note that, in the main refrigerant circuit 58, a four-way valve 59 is provided on the discharge side of the compressor 51; therefore, the circulating direction of the refrigerant can be switched. A fan 60 is provided near the heat exchanger 57. The compression mechanism that compresses the refrigerant and the compressor motor that actuates the compression mechanism are provided in the compressor 51. Further, the refrigeration cycle 50a includes an injection circuit 62 that connects, with a pipe, from between the receiver 54 and the internal heat exchanger 55 to an injection pipe of the compressor 51. An expansion mechanism 61 and the internal heat exchanger 55 are sequentially connected to the injection circuit 62.

A water circuit 63, through which water circulates, is connected to the heat exchanger 52. Note that, a device that makes use of water such as a water heater (not illustrated), a radiator (not illustrated), or a radiator for floor heating (not illustrated) is connected to the water circuit 63.

First, an operation during a heating operation in the refrigeration cycle 50a is explained. During the heating operation, the four-way valve 59 is set in the direction of the solid line in FIG. 21. Note that, the heating operation includes not only a heating operation in the air conditioner but also a water heating operation for applying heat to water and making hot water in a heat pump water heart.

Figure 22:
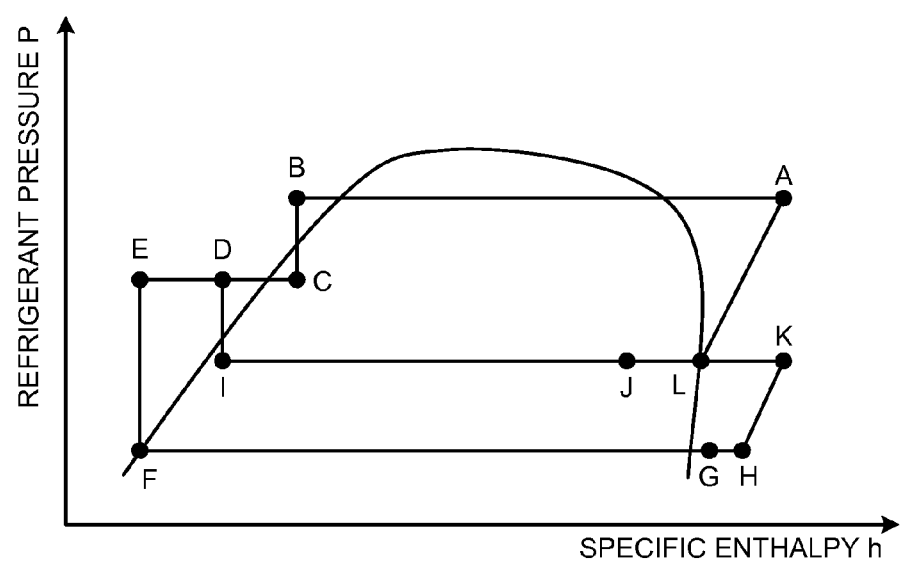
FIG. 22 is a Mollier chart illustrating state transition of a refrigerant in the refrigeration cycle illustrated in FIG. 21.

In FIG. 22, a gas-phase refrigerant (at point A in FIG. 22) heated and compressed to high temperature and high pressure by the compressor 51 is discharged from the compressor 51, exchanges heat in the heat exchanger 52 functioning as a condenser and a radiator, and liquefied (at point B in FIG. 22). At this point, the water circulating through the water circuit 63 is warmed by heat radiated from the refrigerant and used for the heating operation in the air conditioner and the water heating operation in the heat pump water heater.

The liquid-phase refrigerant liquefied by the heat exchanger 52 is decompressed and changed to a gas-liquid two-phase state by the expansion mechanism 53 (at point C in FIG. 22). The refrigerant changed to the gas-liquid two-phase state by the expansion mechanism 53 exchanges heat with the refrigerant drawn into the compressor 51 in the receiver 54 so as to be cooled and liquefied (at point D in FIG. 22). The liquid-phase refrigerant liquefied by the receiver 54 is divided between the main refrigerant circuit 58 and the injection circuit 62 and flows therein.

The liquid-phase refrigerant flowing through the main refrigerant circuit 58 exchanges heat with the refrigerant decompressed and changed to the gas-liquid two-phase state by the expansion mechanism 61 and flowing through the injection circuit 62 and is further cooled by the internal heat exchanger 55 (at point E in FIG. 22). The liquid-phase refrigerant cooled by the internal heat exchanger 55 is decompressed and changed to the gas-liquid two-phase state by the expansion mechanism 56 (at point F in FIG. 22). The refrigerant changed to the gas-liquid two-phase state by the expansion mechanism 56 exchanges heat with the outdoor air in the heat exchanger 57 functioning as an evaporator and is heated (at point G in FIG. 22). The refrigerant heated by the heat exchanger 57 is further heated by the receiver 54 (at point H in FIG. 22) and is drawn into the compressor 51.

On the other hand, as explained above, the refrigerant flowing through the injection circuit 62 is decompressed by the expansion mechanism 61 (at point I in FIG. 22) and exchanges heat in the internal heat exchanger 55 (at point J in FIG. 22). The refrigerant (an injection refrigerant) in the gas-liquid two-phase state that has exchanged heat in the internal heat exchanger 55 flows into the compressor 51 from the injection pipe of the compressor 51 while keeping the gas-liquid two-phase state.

In the compressor 51, the refrigerant drawn in from the main refrigerant circuit 58 (at point H in FIG. 22) is compressed and heated to an intermediate pressure (at point K in FIG. 22). The injection refrigerant (at point J in FIG. 22) merges with the refrigerant compressed and heated to the intermediate pressure (at point K in FIG. 22); therefore, the temperature of the refrigerant falls (at point L in FIG. 22). The refrigerant having the low temperature (at point L in FIG. 22) is further compressed and heated to high temperature and high pressure and is discharged (at point A in FIG. 22).

Note that, when the injection operation is not performed, the expansion mechanism 61 is fully closed. That is, when the injection operation is performed, the opening degree of the expansion mechanism 61 is larger than a predetermined opening degree. However, when the injection operation is not performed, the opening degree of the expansion mechanism 61 is set smaller than the predetermined opening degree. Consequently, the refrigerant does not flow into the injection pipe of the compressor 51. Note that, the opening degree of the expansion mechanism 61 is controlled by electronic control by a control unit (not illustrated) such as a microcomputer.

An operation during a cooling operation in the refrigeration cycle 50a is explained. During the cooling operation, the four-way valve 59 is set in the direction indicated by the broken line in FIG. 21. Note that, the cooling operation includes not only a cooling operation in the air conditioner but also drawing heat from water to make cold water in the refrigerator and a freezing operation in the freezing machine.

The gas-phase refrigerant (at point A in FIG. 22) heated and compressed to high temperature and high pressure by the compressor 51 is discharged from the compressor 51, exchanges heat in the heat exchanger 57 functioning as a condenser and a radiator, and liquefied (at point B in FIG. 22). The liquid-phase refrigerant liquefied by the heat exchanger 57 is decompressed and changed to the gas-liquid two-phase state by the expansion mechanism 56 (at point C in FIG. 22). The refrigerant changed to the gas-liquid two-phase state by the expansion mechanism 56 exchanges heat in the internal heat exchanger 55 so as to be cooled and liquefied (at point D in FIG. 22). In the internal heat exchanger 55, the refrigerant changed to the gas-liquid two-phase state by the expansion mechanism 56 exchanges heat with the refrigerant changed to the gas-liquid two-phase state by decompressing the liquid-phase refrigerant liquefied in the internal heat exchanger 55, in the expansion mechanism 61 (at point I in FIG. 22). The liquid-phase refrigerant exchanged heat in the internal heat exchanger 55 (at point D in FIG. 22) is divided between the main refrigerant circuit 58 and the injection circuit 62 and flows therein.

The liquid-refrigerant flowing through the main refrigerant circuit 58 exchanges heat with the refrigerant drawn into the compressor 51 and further cooled by the receiver 54 (at point E in FIG. 22). The liquid-phase refrigerant cooled by the receiver 54 is decompressed and changed to the gas-liquid two-phase state by the expansion mechanism 53 (at point F in FIG. 22). The refrigerant changed to the gas-liquid two-phase state by the expansion mechanism 53 exchanges heat and is heated by the heat exchanger 52 functioning as an evaporator (at point G in FIG. 22). At this point, the refrigerant absorbs heat, whereby the water circulating through the water circuit 63 is cooled and used for the cooling operation in the air conditioner and the freezing operation in the freezing machine.

The refrigerant heated by the heat exchanger 52 is further heated by the receiver 54 (at point H in FIG. 22) and is drawn into the compressor 51.

In contrast, as explained above, the refrigerant flowing through the injection circuit 62 is decompressed by the expansion mechanism 61 (at point I in FIG. 22) and exchanges heat in the internal heat exchanger 55 (at point J in FIG. 22). The refrigerant (the injection refrigerant) in the gas-liquid two-phase state that has exchanged heat in the internal heat exchanger 55 flows into the compressor 51 from the injection pipe of the compressor 51 while keeping the gas-liquid two phase state.

A compression operation in the compressor 51 is similar to the compression during the heating operation. Therefore, explanation thereof is omitted.

Note that, when the injection operation is not performed, as in the heating operation, the expansion mechanism 61 is fully closed to prevent the refrigerant from flowing into the injection pipe of the compressor 51.

In the above explanation, the heat exchanger 52 is explained as a heat exchanger like a plate-type heat exchanger that exchanges heat between the refrigerant and water circulating in the water circuit 63. The heat exchanger 52 is not limited thereto and may be other types of heat exchangers that exchange heat between a refrigerant and air.

The water circuit 63 may not be a circuit through which water circulates, but may be a circuit through which fluid other than water circulates.

As explained above, with the air conditioner, the heat pump water heater, the refrigerator, and the freezing machine in the second embodiment, by applying the heat pump device described in the first embodiment, it is possible to obtain the effects explained in the first embodiment.

Note that, as the switching elements configuring the inverter in the embodiments and the reflux diodes connected to the switching elements in parallel, in general, an Si semiconductor made of silicon (Si) is mainly used. However, a wide band gap (WBG) semiconductor made of silicon carbide (SiC), gallium nitride (GaN), or diamond can be used.

Switching elements and diode elements formed by such a WBG semiconductor have high voltage resistance and also has high allowable current density. Therefore, it is possible to reduce the switching elements and the diode elements in size. By using the switching elements and the diode elements reduced in size, it is possible to reduce a semiconductor module incorporating these elements in size.

The switching elements and the diode elements formed by such a WBG semiconductor also have high heat resistance. Therefore, it is possible to reduce heat radiation fins of a heat sink in size and change a water cooling section to air cooling. Therefore, it is possible to further reduce the semiconductor module in size.

Further, the switching elements and the diode elements formed by such a WBG semiconductor have a low power loss. Therefore, the switching elements and the diode elements can be made to have a high efficiency, thereby enabling a semiconductor module to be highly efficient.

Switching at a higher frequency is possible. Thus, it is possible to feed an electric current having a higher frequency to the compressor motor. Therefore, it is possible to reduce an electric current flowing to the inverter through a reduction in a winding current by an increase in the winding impedance of the compressor motor. Therefore, it is possible to obtain the heat pump device having higher efficiency. Further, because it is easy to increase the frequency, there is an advantage that, for example, it is possible to set a frequency equal to or higher than the audible frequency band and it is easy to take measures against noise.

When the direct-current energization is used together with the high-frequency energization, for example, there is not only an advantage that heat generation decreases because the power loss decreases but also an advantage that, even if a large current flows, a heat pump device with high reliability can be obtained because heat resistance performance is high.

Note that, it is desirable that both of the switching elements and the diode elements are formed by the WBG semiconductor. However, at least one of the elements can be formed by the WBG semiconductor. It is possible to obtain the effects in the embodiments.

Besides the WBG semiconductor, when a MOSFET (Metal-Oxide-Semiconductor Field-Effect Transistor) of a super junction structure known as a high-efficiency switching element is used, it is also possible to obtain the same effects.

In a compressor of a scroll mechanism, high-pressure relief of a compression chamber is difficult. Therefore, compared with compressors of other systems, it is highly likely that excessively large stress is applied to a compression mechanism when liquid compression is performed. However, in the heat pump device according to the embodiments, it is possible to efficiently heat the compressor and suppress the liquid refrigerant from stagnating in the compressor. Therefore, because it is possible to prevent the liquid compression, the heat pump device is also effective when the compressor of the scroll mechanism is used.

Further, when the high-frequency energization is carried out, in the case of a heating device exceeding a frequency of 10 kilohertz and an output of 50 watts, the heating device is sometimes restricted by law. Therefore, the voltage command V* can be adjusted in advance such that the power does not exceed 50 watts, or the flowing current and the voltage can be detected to perform feedback control such that the power is equal to or smaller than 50 watts.

Note that, the inverter control unit can be configured by a discrete system of a CPU (Central Processing Unit), a DSP (Digital Signal Processor), or a microcomputer. Besides, the inverter control unit can be configured by an electric circuit element such as an analog circuit or a digital circuit.

The configurations illustrated in the above embodiments are examples of the configuration of the present invention and it is obvious that the configurations can be combined with other publicly known technologies and the configurations can be changed, for example, by omitting a part thereof without departing from the scope of the present invention.

INDUSTRIAL APPLICABILITY

As explained above, the present invention is useful as a technology for preventing a liquid refrigerant from stagnating in a compressor when the compressor is under operation standby in a heat pump device and in an air conditioner, a heat pump water heater, a refrigerator, and a freezing machine including the heat pump device and, in particular, suitable for a configuration in which a high-frequency voltage having a frequency higher than a frequency during a normal operation is supplied to the compressor motor to perform locked energization.

The invention claimed is:

1. A heat pump device that includes an inverter that applies a desired voltage to a compressor motor, the heat pump device comprising
   an inverter control unit
      to restore, on a basis of respective inter-phase voltages, respective phase voltages, or respective phase currents of the compressor motor for a plurality of high-frequency energization cycles when a high-frequency voltage having a frequency higher than a frequency during a normal operation is supplied to the compressor motor to perform locked energization of the compressor motor while a compressor is under operation standby, the respective inter-phase voltages, the respective phase voltages, or the respective phase currents for a predetermined range of the plurality of high-frequency energization cycles, and to control a voltage to be applied to the compressor motor on a basis of at least one of the restored respective detection values for the predetermined range.

2. The heat pump device according to claim 1, wherein the inverter control unit detects, in each of cycles 1 to n (n is an integer equal to or larger than 2) of the high-frequency energization cycles, the respective inter-phase voltages, the respective phase voltages, or the respective phase currents in a phase that is a (m/n) cycle (m is a natural number equal to or smaller than n) later than a start point of a corresponding one of the cycles and is different for each of the cycles, calculates a power value using the respective detection values for one high-frequency energization cycle,
   generates a heating power command necessary for discharging liquid refrigerant that is stagnated in the compressor to an outside of the compressor, and controls such that the power value coincides with the heating power command.

3. The heat pump device according to claim 2, wherein the inverter control unit detects the respective inter-phase voltages, the respective phase voltages, or the respective phase currents while shifting a phase by a (1/n) cycle at a time over n high-frequency energization cycles (n is an integer equal to or larger than 2).

4. The heat pump device according to claim 2, wherein, while the inverter control unit is detecting the respective detection values for one high-frequency energization cycle, when a bus voltage value of the inverter fluctuates in excess of a predetermined range, the inverter control unit discards the respective detection values that have been detected and restarts detection of the respective detection values starting from a first high-frequency energization cycle.

5. The heat pump device according to claim 2, wherein the inverter control unit inverts a phase of the high-frequency voltage in synchronization with a carrier signal of the inverter.

6. The heat pump device according to claim 5, wherein the inverter control unit sets a reference phase of the high-frequency voltage to a multiple of 60° with respect to the carrier signal of the inverter.

7. The heat pump device according to claim 2, wherein the inverter control unit detects at least one of temperature of any of parts or components configuring the heat pump device and atmospheric temperature and estimates the amount of liquid refrigerant.

8. The heat pump device according to claim 2, wherein the inverter control unit senses a liquid amount or a liquid surface of the liquid refrigerant stagnated in the compressor and detects the amount of liquid refrigerant.

9. The heat pump device according to claim 2, wherein the inverter control unit generates the heating power command according to a characteristic of the compressor.

10. The heat pump device according to claim 2, wherein the inverter control unit has, as a gain and a frequency characteristic when detecting the phase currents, at least two kinds of gain and two kinds of frequency characteristic for the locked energization and for a normal operation for driving the compressor motor.

11. The heat pump device according to claim 1, wherein at least one of switching elements constituting the inverter is formed from a wide band gap semiconductor.

12. The heat pump device according to claim 1, wherein a diode constituting the inverter is formed from a wide band gap semiconductor.

13. The heat pump device according to claim 11, wherein the wide band gap semiconductor is any of silicon carbide, a gallium nitride material, and diamond.

14. The heat pump device according to claim 12, wherein the wide band gap semiconductor is any of silicon carbide, a gallium nitride material, and diamond.

15. An air conditioner comprising the heat pump device according to claim 1.

16. A heat pump water heater comprising the heat pump device according to claim 1.

17. A refrigerator comprising the heat pump device according to claim 1.

18. A freezing machine comprising the heat pump device according to claim 1.

* * * * *